United States Patent
Beck et al.

(10) Patent No.: US 11,198,243 B2
(45) Date of Patent: Dec. 14, 2021

(54) METHOD AND APPARATUS FOR FORMING FINAL-SHAPED CONTAINERS USING LIQUID TO BE CONTAINED THEREIN

(71) Applicant: HUSKY INJECTION MOLDING SYSTEMS LTD., Bolton (CA)

(72) Inventors: Christophe Simon Pierre Beck, Terville (FR); Jean-Christophe Witz, Yutz (FR); Sebastian Rasche, Trier (DE)

(73) Assignee: HUSKY INJECTION MOLDING SYSTEMS LTD., Bolton (CA)

(*) Notice: Subject to any disclaimer, the term of this patent is extended or adjusted under 35 U.S.C. 154(b) by 0 days.

(21) Appl. No.: 16/961,385

(22) PCT Filed: Dec. 28, 2018

(86) PCT No.: PCT/CA2018/051678
§ 371 (c)(1),
(2) Date: Jul. 10, 2020

(87) PCT Pub. No.: WO2019/136551
PCT Pub. Date: Jul. 18, 2019

(65) Prior Publication Data
US 2020/0361132 A1    Nov. 19, 2020

Related U.S. Application Data

(60) Provisional application No. 62/616,014, filed on Jan. 11, 2018.

(51) Int. Cl.
*B29C 49/12* (2006.01)
*B29C 49/46* (2006.01)
(Continued)

(52) U.S. Cl.
CPC .......... *B29C 49/06* (2013.01); *B29C 49/12* (2013.01); *B29B 2911/1402* (2013.01);
(Continued)

(58) Field of Classification Search
CPC ... B29C 49/12; B29C 49/46; B29C 2049/465; B29C 2049/4655; B29C 2049/4664;
(Continued)

(56) References Cited

U.S. PATENT DOCUMENTS 4,315,725 A * 2/1982 Yoshino ............... B29C 49/58
                                                                 219/388
4,880,593 A    11/1989 Strassheimer
(Continued)

FOREIGN PATENT DOCUMENTS

CN    104321270 B    1/2015
FR    3022824 A1 *  1/2016   ........... B29C 49/12
(Continued)

OTHER PUBLICATIONS

Partial machine translation of FR3022824A1 dated Jan. 2016 obtained from the espace website. (Year: 2016).*
(Continued)

*Primary Examiner* — Robert B Davis

(57) ABSTRACT

A method, system, and preform for liquid forming of the preform into a final-shaped container using the liquid to be contained in the final-shaped container. The preform undergoes a stretching step to a size less than the size of a base of the final-shaped container, before being relocated and stretched to the final shape by the liquid. A stretch rod sealably connects with an interior surface of the preform to partially isolate a gate portion of the preform. The isolation is effected by a portion of the inner surface of the preform extending inwardly, or by a deformable member on the stretch rod which can selectively extend outwardly to con- (Continued)

tact the interior surface of the preform. The stretch rod includes a selectively heatable tip to heat the gate portion of the preform. The gate portion of the preform includes inner, outer, and core layers which comprise a material configured to affect the thermal properties of the gate portion.

11 Claims, 24 Drawing Sheets

(51) Int. Cl.
    *B29C 49/06*     (2006.01)
    *B29C 49/42*     (2006.01)
    *B29C 49/58*     (2006.01)
    *B29L 31/00*     (2006.01)

(52) U.S. Cl.
    CPC .......... *B29C 2049/1238* (2013.01); *B29C 2049/4294* (2013.01); *B29C 2049/4664* (2013.01); *B29C 2049/5827* (2013.01); *B29L 2031/7158* (2013.01)

(58) Field of Classification Search
    CPC .... B29C 2049/1238; B29C 2049/1242; B29C 2049/1228
    See application file for complete search history.

(56) References Cited

U.S. PATENT DOCUMENTS

| | | | |
|---|---|---|---|
| 5,085,822 A | 2/1992 | Uehara et al. |
| 5,290,506 A | 3/1994 | Yobobayashi |
| 5,618,489 A | 4/1997 | Weissmann |
| 7,367,795 B2 | 5/2008 | Hutchinson et al. |
| 7,473,388 B2 | 1/2009 | Desanaux et al. |
| 7,914,726 B2 | 3/2011 | Andison et al. |
| 8,017,064 B2 | 9/2011 | Andison et al. |
| 8,435,026 B2 | 5/2013 | Andison et al. |
| 8,444,908 B2 | 5/2013 | Radermacher |
| 8,573,964 B2 | 11/2013 | Andison et al. |
| 8,684,723 B2 | 4/2014 | Lisch et al. |
| 8,714,963 B2 | 5/2014 | Andison et al. |
| 8,714,964 B2 | 5/2014 | Lisch et al. |
| 8,720,166 B2 | 5/2014 | Chauvin et al. |
| 8,721,315 B2 | 5/2014 | Maki et al. |
| 8,727,758 B2 | 5/2014 | Eberle et al. |
| 8,740,609 B2 | 6/2014 | Andison et al. |
| 8,827,688 B2 | 9/2014 | Maki et al. |
| 8,828,308 B2 | 9/2014 | Maki et al. |
| 8,834,778 B2 | 9/2014 | Maki et al. |
| 8,858,214 B2 | 10/2014 | Andison et al. |
| 8,864,490 B2 | 10/2014 | Fevre et al. |
| 8,968,636 B2 | 3/2015 | Eberle |
| 9,023,446 B2 | 5/2015 | Silvers et al. |
| 9,044,887 B2 | 6/2015 | Cooper et al. |
| 9,079,345 B2 | 7/2015 | Chauvin et al. |
| 9,079,676 B2 | 7/2015 | Feuilloley |
| 9,085,099 B2 | 7/2015 | Hirdina |
| 9,180,621 B2 | 11/2015 | Sato et al. |
| 9,216,537 B2 | 12/2015 | Wilson et al. |
| 9,221,223 B2 | 12/2015 | Lisch et al. |
| 9,254,617 B2 | 2/2016 | Maki et al. |
| 9,259,887 B2 | 2/2016 | Fevre et al. |
| 9,278,770 B2 | 3/2016 | Haesendonckx et al. |
| 9,302,421 B2 | 4/2016 | Wilson et al. |
| 9,314,955 B2 | 4/2016 | Eberle et al. |
| 9,339,968 B2 | 5/2016 | Eberle |
| 9,421,708 B2 | 8/2016 | Tamura et al. |
| 9,421,709 B2 | 8/2016 | Kumar et al. |
| 9,522,508 B2 | 12/2016 | Wilson et al. |
| 9,586,358 B2 | 3/2017 | Knapp |
| 2005/0046085 A1 | 3/2005 | Voth et al. |
| 2006/0073294 A1 | 4/2006 | Hutchinson et al. |
| 2009/0223920 A1 | 9/2009 | Patel et al. |
| 2011/0236524 A1 | 9/2011 | Blockmann et al. |
| 2013/0106028 A1 | 5/2013 | Lisch et al. |
| 2013/0161878 A1 | 6/2013 | Maki et al. |
| 2015/0076105 A1 | 3/2015 | Sato et al. |
| 2015/0183150 A1 | 7/2015 | Chauvin et al. |
| 2015/0190960 A1 | 7/2015 | Chauvin et al. |
| 2015/0246475 A1 | 9/2015 | Suyama et al. |
| 2015/0314518 A1 | 11/2015 | Gillet |
| 2015/0328823 A1 | 11/2015 | Kannengiesser |
| 2015/0336688 A1 | 11/2015 | Chauvin et al. |
| 2015/0375441 A1 | 12/2015 | Desoutter et al. |
| 2016/0001491 A1 | 1/2016 | Desoutter et al. |
| 2016/0046061 A1 | 2/2016 | Chauvin et al. |
| 2016/0052177 A1 | 2/2016 | Chauvin et al. |
| 2016/0059469 A1 | 3/2016 | Diesnis et al. |
| 2016/0068379 A1 | 3/2016 | Desoutter et al. |
| 2016/0082644 A1 | 3/2016 | Chauvin et al. |
| 2016/0082646 A1 | 3/2016 | Chauvin et al. |
| 2016/0089828 A1 | 3/2016 | Desoutter et al. |
| 2016/0107366 A1 | 4/2016 | Gillet |
| 2016/0107367 A1 | 4/2016 | Maki et al. |
| 2016/0121539 A1 | 5/2016 | Chauvin et al. |
| 2016/0129621 A1 | 5/2016 | Lisch et al. |
| 2016/0129623 A1 | 5/2016 | Chauvin et al. |
| 2016/0136866 A1 | 5/2016 | Kumar |
| 2016/0144550 A1 | 5/2016 | Kumar et al. |
| 2016/0167257 A1 | 6/2016 | Chauvin et al. |
| 2016/0185029 A1 | 6/2016 | Wilson et al. |
| 2016/0207242 A1 | 7/2016 | Ferrari |
| 2016/0236396 A1 | 8/2016 | Chauvin et al. |
| 2016/0243747 A1 | 8/2016 | Gillet |
| 2016/0250798 A1 | 9/2016 | Diesnis |
| 2016/0271858 A1 | 9/2016 | Diesnis |
| 2016/0318228 A1 | 11/2016 | Drzewiecki et al. |
| 2016/0318229 A1 | 11/2016 | Drzewiecki et al. |
| 2016/0318230 A1 | 11/2016 | Linke et al. |
| 2017/0144356 A1 | 5/2017 | Lisch et al. |
| 2017/0312978 A1 | 11/2017 | Okuyama et al. |

FOREIGN PATENT DOCUMENTS

| | | | | |
|---|---|---|---|---|
| JP | 57117929 A | * | 7/1982 | ......... B29C 49/4823 |
| JP | S6061228 A | | 4/1985 | |
| JP | 2013209101 A | | 10/2013 | |
| JP | 2014188854 A | | 10/2014 | |
| JP | 5851308 B2 | | 2/2016 | |
| JP | 2016210142 A1 | | 12/2016 | |
| WO | 2003095179 A1 | | 11/2003 | |
| WO | 2011079917 A1 | | 7/2011 | |
| WO | 2013014062 A1 | | 1/2013 | |
| WO | 2013147065 A1 | | 10/2013 | |
| WO | 2015136369 A2 | | 9/2015 | |

OTHER PUBLICATIONS

Partial machine translation of JP57117929A dated Jul. 1982 obtained from the espace website. (Year: 1982).*

LiquiForm(tm) Most Advanced Blow Molding and Filling Technology, http://liquiformgroup.com, 2016, 1 page.

* cited by examiner

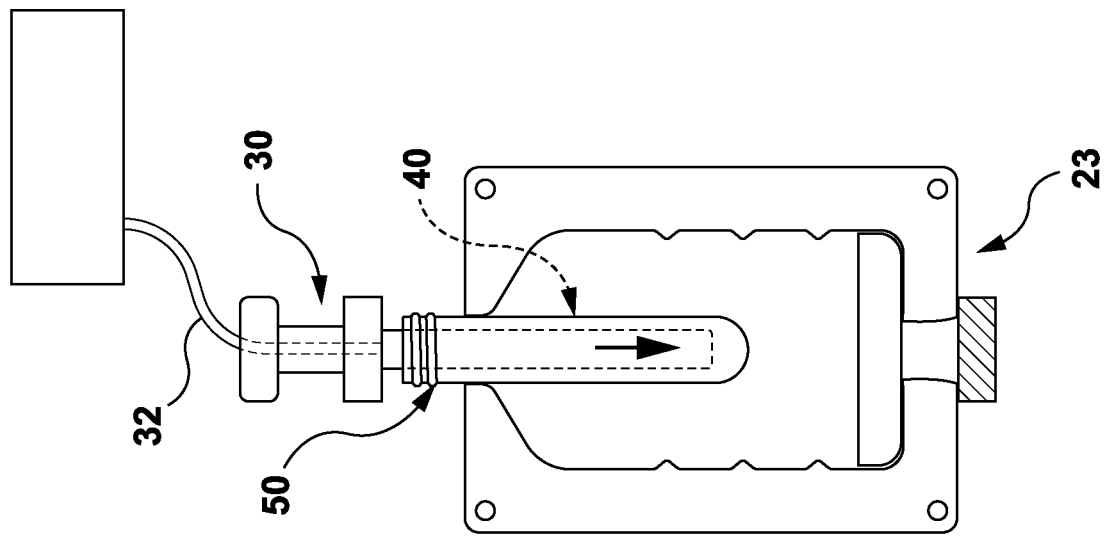
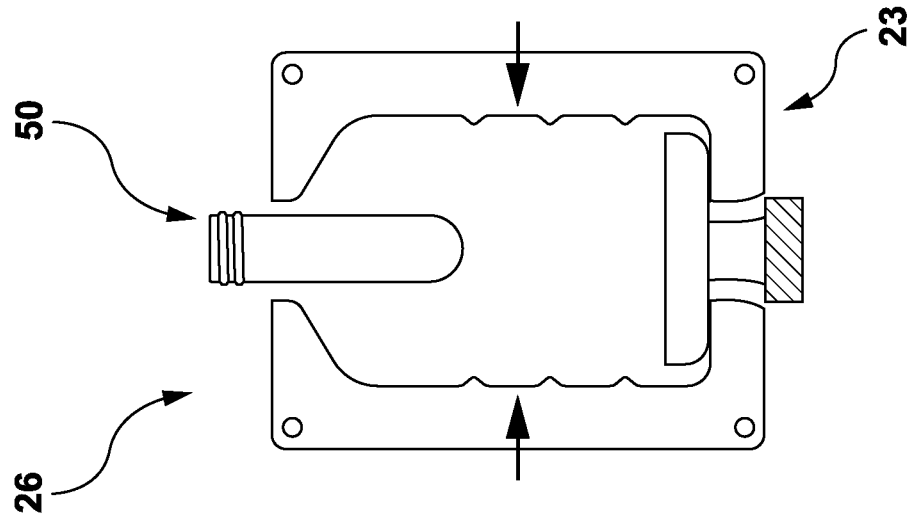
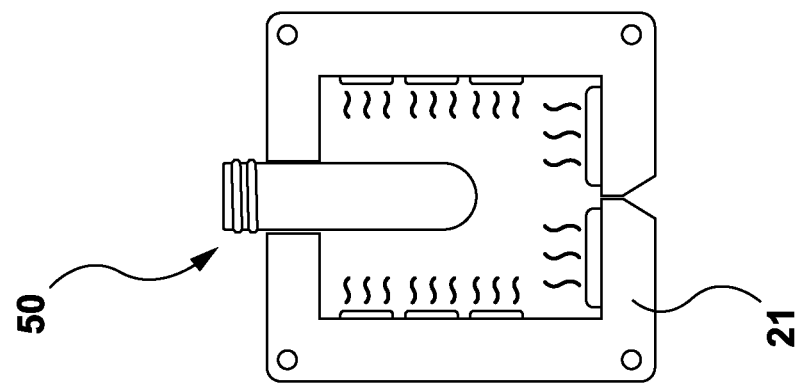

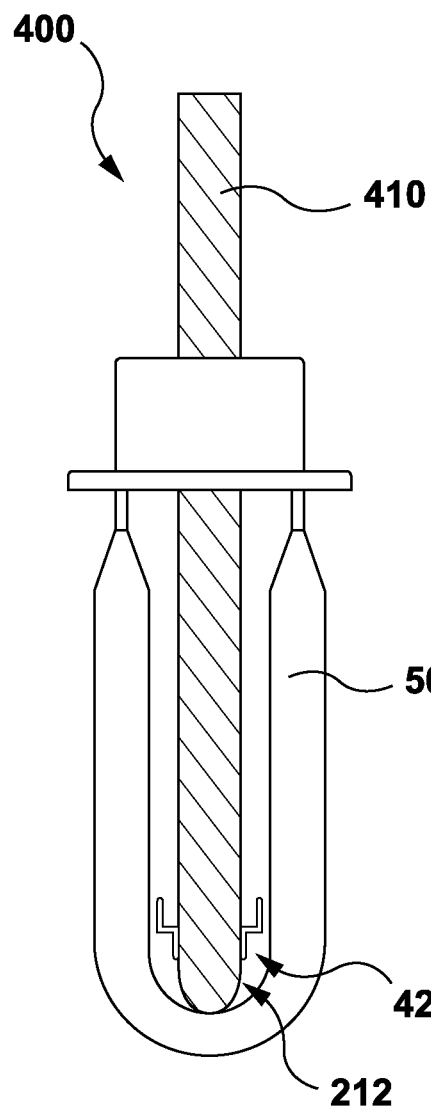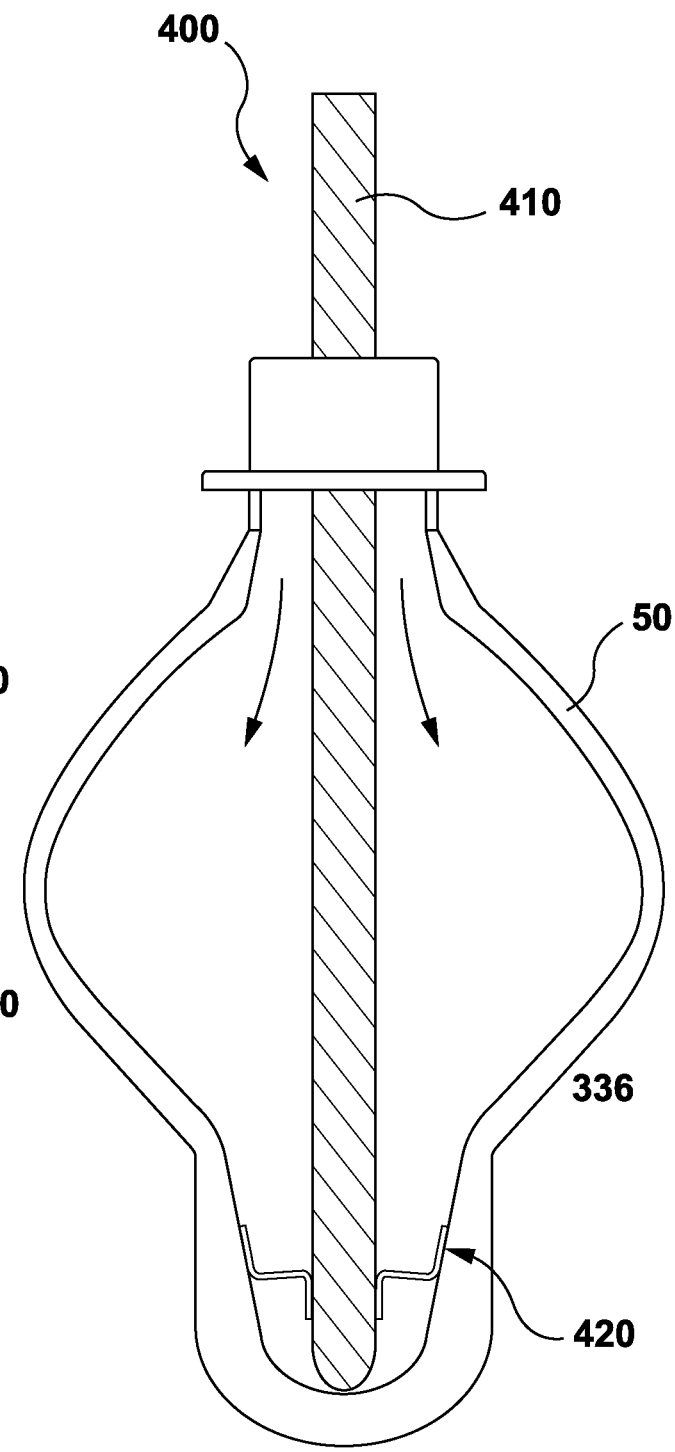
FIG. 9A
FIG. 9B

METHOD AND APPARATUS FOR FORMING FINAL-SHAPED CONTAINERS USING LIQUID TO BE CONTAINED THEREIN

FIELD

This application relates to methods, apparatuses, systems and preforms for molding containers in general and, more specifically, for molding preforms into final-shaped containers using a liquid, the liquid being a product to be contained in the final-shaped container.

BACKGROUND

In many typical molding processes, the molding process includes cycles of bringing two or three complementary mold portions holding mold parts with features defining an article to be molded into a close proximity or directly into contact. Generally one of the complementary parts is stationary, and the other is moveable with respect to the stationary part. During the molding process, a preform (as an example of the molded article being produced) can be produced. The preform is a precursor to a final-shaped container. The preform can be reheated and formed into the final-shaped container by a stretch blow molding process. Such a two stage process (first making the preform and then reshaping the preform into the final-shaped container) is useful in various circumstances, most notably, where the production of the preforms and the filling of the final-shaped container are separated in space and/or time.

It is typical in this art for the production of preforms to be performed by a first entity (typically known as a "converter") and the forming of the final-shaped container and the filling the final-shaped container with the content to be executed by a different entity (typically known as a "filler"), It is known in the art that liquid, specifically a liquid product to be contained in the final-shaped container, can be used for forming the final-shaped container. This process is generally referred to as "liquid forming" or "form filling" of the final-shaped container from the preform.

One example of such a process is disclosed in U.S. Pat. No. 9,259,887 (issued to Fevre et al. on Feb. 16, 2016). There is disclosed a method of forming a container (18) that includes: a partial expansion first step (E1) during which the container (18) is filled with a pressurized blowing gas (G); a second step (E2) of filling the container (18) during which the container (18) is filled with a filling liquid (L) that expels the blowing gas (G) through an outlet orifice (34); and a third step (E3) during which the contents of the container (18) are put under a pressure (HP) so as to make the container (18) conform to its final state (18D), characterized in that, during the filling second step (E2), the ratio of the flow rate of the incoming filling liquid (L) to the flow rate of the outgoing blowing gas (G) is controlled so as to allow the container (18) to continue to expand during this second step (E2).

SUMMARY

Developers of the present technology have developed various embodiments thereof based on their appreciation of at least one technical problem associated with the prior art approaches to forming final-shaped containers using liquids and, particularly, to preventing gate portions of preforms to be stretched from cooling too quickly due to liquid expansion.

Without wishing to be bound to any specific theory, embodiments of the present technology have been developed based on a premise that gate portions of the preform may cool overly rapidly when liquids are used to perform the blow-molding. The liquid, generally a liquid product to be contained in the final-shaped container (such as a beverage, as one example), will generally cause the stretching to initiate from the neck portion of the preform and to gradually "move" towards the bottom portion of the preform. In those cases where the gate portion of the preform cools too rapidly due to the use of liquid stretching, the bottom portion of the final container (including the gate portion and, potentially, the lower portions of the body portion of the preform) may not fully form to the shape required for the final-shaped container (i.e. it will not fully "fit" the cavity of the stretch cavity), or may form with defects (for example, by over-stretching some portions or with crystallization defects).

There is therefore a need for solutions that aid in preventing malformations of bottom portions of final-shaped containers when molding from preforms using a liquid destined to be contained in the final-shaped container.

As such, in accordance with a first broad aspect of the present technology, there is provided a method of forming and filling a final-shaped container using a liquid, the liquid being a product to be contained in the final-shaped container. The method comprises forming a preform by injection molding in an injection molding machine; removing the preform from the injection molding machine by an end of arm tool; forming a prepared preform by blowing a base portion of the preform to a stretched size, the stretched size being less than the size of a base of the final-shaped container; relocating the prepared preform to a forming cavity of a forming machine for simultaneously forming and filling using the liquid to be contained in the final-shaped container, the forming cavity having an internal surface; sealably connecting a nozzle onto an opening of the prepared preform; and stretching the prepared preform into conformity with the internal surface of the forming cavity by filling an interior of the preform with the liquid through the nozzle, pressure of the liquid entering the prepared preform causing the prepared preform to expand.

In some embodiments, the end of arm tool includes a forming cavity adapted for forming the prepared preform; and the removing the preform from the injection molding machine by an end of arm tool comprises positioning the preform in the forming cavity; and the forming the prepared preform comprises blowing the base portion to the stretched size by the end of arm tool.

In some embodiments, the removing the preform from the injection molding machine by an end of arm tool further comprises positioning the preform in a forming cavity of a preparation station, the preparation station being separate from the forming machine and the end of arm tool; and the forming the prepared preform comprises blowing the base portion to the stretched size by the preparation station.

As such, in accordance with another broad aspect of the present technology, there is provided a method of simultaneously forming and filling a final-shaped container from a preform using a liquid, the liquid being a product to be contained in the final-shaped container. The method comprises locating the preform in a mold cavity having an internal surface; sealably connecting a nozzle onto an opening of the preform; inserting a stretch rod through the nozzle into the opening of the preform, at least a lower portion of the stretch rod sealably connecting with an interior surface of the preform to at least partially isolate a gate portion; and stretching the preform into conformity with the internal surface of the mold cavity by: filling an interior of the preform with the liquid through the nozzle, and extending the stretch rod farther into the gate portion.

In some embodiments, the stretch rod includes a deformable member configured to at least partially isolate the gate portion of the preform from the liquid when extended; and when filling an interior of the preform with the liquid through the nozzle, the liquid causes the deformable member to extend out from the stretch rod to contact the interior surface of the preform to form a temporary seal to at least partially isolate the gate portion from the liquid.

In some embodiments, the deformable member is a rubber cup disposed about a lower portion of the stretch rod.

In some embodiments, the rubber cup radially extends from the stretch rod.

In some embodiments, the deformable member is repositionable between an engaged configuration and a disengaged configuration, in the disengaged configuration the deformable member being dimensioned to pass through a neck opening of the preform.

In some embodiments, the deformable member is repositioned into the engaged configuration by the pressure of the liquid filling the interior of the preform.

In some embodiments, the deformable member is repositioned into the disengaged configuration by a decrease of the pressure of the liquid filling the interior of the preform.

In some embodiments, the stretch rod includes a controllably-extendible sealing member for selectively and at least partially isolating the gate portion of the preform from the liquid; and the method further comprises actuating the controllably-extendible sealing member to extend out from the stretch rod to contact the interior surface of the preform to form a temporary seal for at least partially isolating the gate portion.

In some embodiments, the controllably-extendible sealing member is actuated by a machine control unit operatively connected to the stretch rod.

In some embodiments, the stretch rod includes a selectively heatable tip; and the method further comprises activating the selectively heatable tip for heating at least the gate portion of the preform before the stretching of the preform.

In some embodiments, the method further comprises prior to the stretching the preform into conformity with the internal surface of the mold cavity: performing a preliminary stretch of the preform by molding the preform to a partially stretched configuration.

In some embodiments, the deformable member is a rubber air bladder disposed about a lower portion of the stretch rod.

In some embodiments, the rubber air bladder is repositionable between an engaged configuration and a disengaged configuration; in the disengaged configuration, the rubber air bladder is dimensioned to pass through a neck opening of the preform; and the rubber air bladder is converted from the disengaged configuration to the engaged configuration by inflating the rubber air bladder.

In some embodiments, the stretch rod includes a controllably-deformable rubber air bladder for selectively and at least partially isolating the gate portion of the preform from the liquid; and wherein the method further comprises inflating the controllably-deformable rubber air bladder to extend out from the stretch rod to contact the interior surface of the preform to form a temporary seal for at least partially isolating the gate portion.

As such, in accordance with yet another broad aspect of the present technology, there is provided a method of simultaneously forming and filling a final-shaped container from a preform using a liquid, the liquid being a product to be contained in the final-shaped container. The method comprises locating the preform in a mold cavity having an internal surface; sealably connecting a nozzle onto an opening of the preform; inserting a stretch rod through the nozzle into the opening of the preform, the stretch rod including a selectively heatable tip; heating the selectively heatable tip for heating at least a gate portion of the preform; and stretching the preform to conform to the internal surface of the mold cavity by: filling an interior of the preform with the liquid through the nozzle, and extending the stretch rod into the gate portion.

As such, in accordance with yet another broad aspect of the present technology, there is provided a method of simultaneously forming and filling a final-shaped container using a liquid, the liquid being a product to be contained in the final-shaped container. The method comprises forming a preform, by injection molding, in a mold cavity defined at least in part between a mold core and a mold cavity portion; removing the preform from the mold cavity portion, the preform remaining on the mold core; locating the mold core and the preform disposed thereon in a container mold having an internal surface; stretching the preform into conformity with the internal surface of the mold cavity by filling an interior of the preform with the liquid through a channel defined by the mold core, pressure of the liquid entering the preform through the mold core causing the preform to expand.

In some embodiments, the locating and the stretching is performed before the preform has cooled to a threshold temperature.

As such, in accordance with yet another broad aspect of the present technology, there is provided an apparatus for simultaneously forming and filling a final-shaped container from a preform using a liquid, the liquid being a product to be contained in the final-shaped container. The apparatus comprises a mold cavity for forming the final-shaped container from the preform; a stretch rod for stretching the preform movable between at least a retracted position outside the mold cavity to an advanced position within the mold cavity, a lower portion of the stretch rod being configured for sealably connecting with an interior surface of the preform to at least partially isolate a gate portion of the preform; and a nozzle for sealably connecting with an opening of the preform, the nozzle including: a channel fluidly communicating with an interior of the preform for transmission of the liquid to expand the preform into conformity with the mold cavity and form the container therein, the channel being further configured to receive the stretch rod therethrough.

In some embodiments, the channel further fluidly communicates with a pressurized air source for performing a preliminary stretch of the preform by blow molding.

In some embodiments, the stretch rod comprises a deformable member configured to at least partially isolate the gate portion of the preform from the liquid when extended, the liquid causing the deformable member to extend out from the stretch rod to contact the interior surface of the preform to form a temporary seal to at least partially isolate the gate portion from the liquid when filling an interior of the preform with the liquid through the nozzle.

In some embodiments, the deformable member is made at least in part from a thermally isolating material.

In some embodiments, the deformable member is made at least on part from a material having low thermal conductivity.

In some embodiments, the material having low thermal conductivity is one of a polymer and a rubber.

In some embodiments, the stretch rod comprises an controllably-extendible sealing member for sealably connecting the lower portion of the stretch rod with the interior surface of the preform, the controllably-extendible sealing member selectively and at least partially isolating the gate portion of the preform from the liquid when extended; and the apparatus further comprises an actuator for extending the controllably-extendible sealing member.

In some embodiments, the controllably-extendible sealing member is made at least in part from a thermally isolating material.

As such, in accordance with yet another broad aspect of the present technology, there is provided an apparatus for simultaneously forming and filling a final-shaped container from a preform using a liquid, the liquid being a product to be contained in the final-shaped container. The apparatus comprises a mold cavity for forming the final-shaped container from the preform; a stretch rod for stretching the preform movable between at least a retracted position outside the mold cavity to an advanced position within the mold cavity, the stretch rod including: a selectively heatable tip; and a nozzle for sealably connecting with an opening of the preform, the nozzle including: a channel fluidly communicating with an interior of the preform for transmission of the liquid to expand the preform into conformity with the mold cavity and form the container therein, the channel being further configured to receive the stretch rod therethrough.

In some embodiments, the selectively heatable tip comprises an internal resistor for causing at least a lower portion of the stretch rod to heat.

In some embodiments, the stretch rod defines at least one channel fluidly communicating with an interior of the preform and a pressurized air source, the stretch rod being configured for partial blow-molding of the preform prior to transmission of the liquid.

As such, in accordance with yet another broad aspect of the present technology, there is provided a preform suitable for subsequent simultaneous forming and filling of a final-shaped container using a liquid, the liquid being a product to be contained in the final-shaped container. The preform comprises a neck portion; a gate portion; and a body portion extending between the neck portion and the gate portion, the neck portion, the gate portion and the body portion defining an inner surface of the preform, a portion of the inner surface extending inward, the portion being adapted for sealably connecting with a stretch rod inserted therein for isolating at least the gate portion from the liquid during the subsequent simultaneous forming and filling of the final-shaped container.

In some embodiments, the portion of the inner surface is a protrusion extending inward from the inner surface, the protrusion being configured for creating a seal with a stretching rod inserted into the preform during the subsequent simultaneous forming and filling; and the protrusion is located near a boundary between the gate portion and the body portion.

In some embodiments, the protrusion is located along one of the boundary between the body portion and the gate portion, and a region of the inner surface extending from the boundary towards a gate nub portion of the gate portion.

As such, in accordance with yet another broad aspect of the present technology, there is provided a system for simultaneously forming and filling a final-shaped container from a preform using a liquid, the liquid being a product to be contained in the final-shaped container. The system comprises the preform comprising a neck portion, a gate portion, and a body portion extending between the neck portion and the gate portion, the neck portion, the gate portion and the body portion defining an inner surface of the preform; and a stretch rod for stretching the preform, the stretch rod movable between at least a retracted position outside the mold cavity to an advanced position within the mold cavity, a portion of the inner surface of the preform extending inward, the portion being adapted for sealably connecting with the stretch rod inserted therein for isolating at least the gate portion from the liquid during the simultaneous forming and filling of the final-shaped container.

As such, in accordance with yet another broad aspect of the present technology, there is provided a preform suitable for subsequent simultaneous forming and filling of a final-shaped container using a liquid, the liquid being a product to be contained in the final-shaped container. The preform comprises a neck portion; a gate portion; and a body portion extending between the neck portion and the gate portion, at least the gate portion including: an inner exterior layer and an outer exterior layer comprising a first polymeric material; and a core layer of a second polymeric material disposed between at least a portion of the inner exterior layer and the outer exterior layer, at least one of the inner exterior layer, the outer exterior layer, and the core layer comprising a thermally isolating material configured to slow a thermal cooling rate of the gate portion.

In some embodiments, each layer of the gate portion comprises the thermally isolating material configured to slow the thermal cooling rate of the gate portion.

As such, in accordance with yet another broad aspect of the present technology, a preform suitable for subsequent simultaneous forming and filling of a final-shaped container using a liquid, the liquid being a product to be contained in the final-shaped container. The preform comprises a neck portion; a gate portion; and a body portion extending between the neck portion and the gate portion, at least the gate portion including: an inner exterior layer and an outer exterior layer comprising a first polymeric material; and a core layer of a second polymeric material disposed between at least a portion of the inner exterior layer and the outer exterior layer, at least one of the inner exterior layer, the outer exterior layer, and the core layer comprising a thermally absorptive material configured to increase a thermal heating rate of the gate portion.

In some embodiments, the additive is a colorant.

In some embodiments, the additive is a fast reheat additive.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 1A-1F schematically depict steps in forming a final-shaped container using a liquid product as known in the prior art.

FIGS. 9A-9B depict side, cross-sectional schematic views of the preform and the stretch rod of the forming machine of FIG. 8.

Figure 1F:
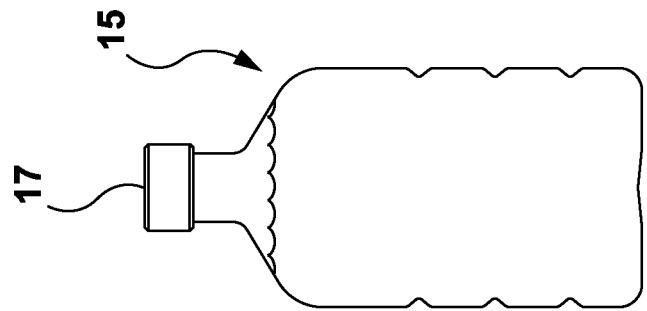
Figure 1E:
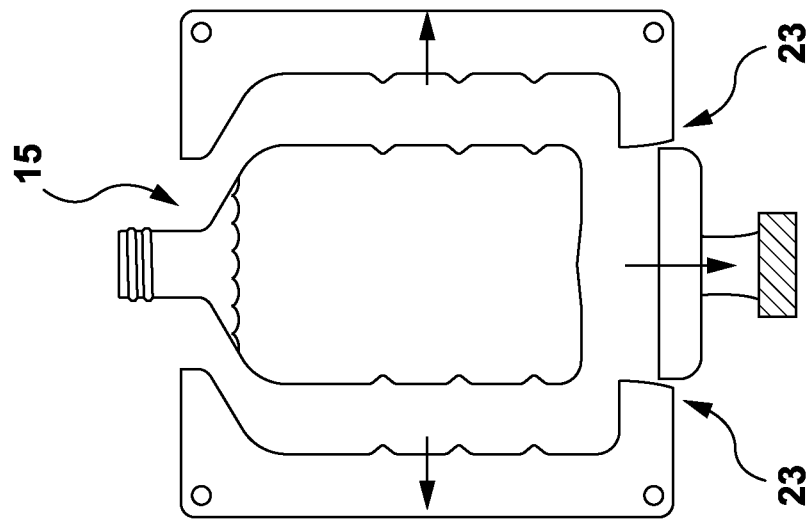
Figure 1D:
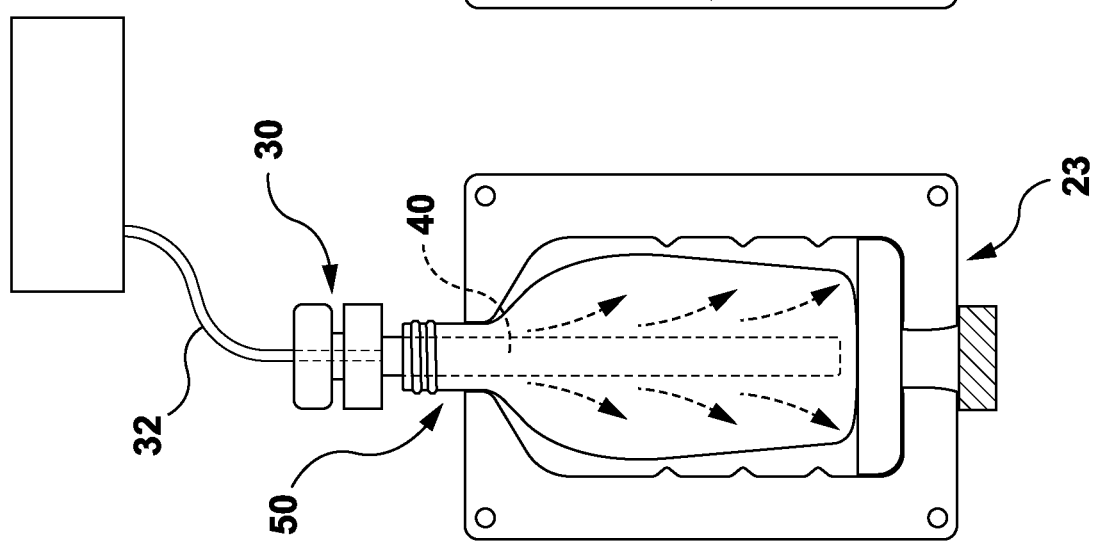

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Reference will now be made in detail to various non-limiting embodiments for preforms and liquid forming systems for reconfiguring the preform to the final-shaped container. It should be understood that other non-limiting implementations, modifications and equivalents will be evident to one of ordinary skill in the art in view of the non-limiting implementations disclosed herein and that these variants should be considered to be within scope of the appended claims. Furthermore, it will be recognized by one of ordinary skill in the art that certain structural and operational details of the non-limiting implementations discussed hereafter may be modified or omitted altogether (i.e. non-essential). In other instances, well known methods, procedures, and components have not been described in detail.

It is to be further expressly understood that the preforms and liquid forming systems and its components are depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the preforms and liquid forming systems and/or its components may also be set forth below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the preforms and liquid forming systems and/or its components may provide in certain instances simple embodiments of the present technology, and that where such is the case they have been presented in this manner as an aid to understanding. As persons skilled in the art would understand, various implementations of the present technology may be of a greater complexity. Furthermore, where specific details of the different implementations are presented with reference to discrete embodiments, a person skilled in the art is expected to combine specific implementational details of one discrete embodiment with specific implementational details of another discrete embodiment, even though such a combination may not be expressly disclosed herein below.

Molding System

Figure 22:
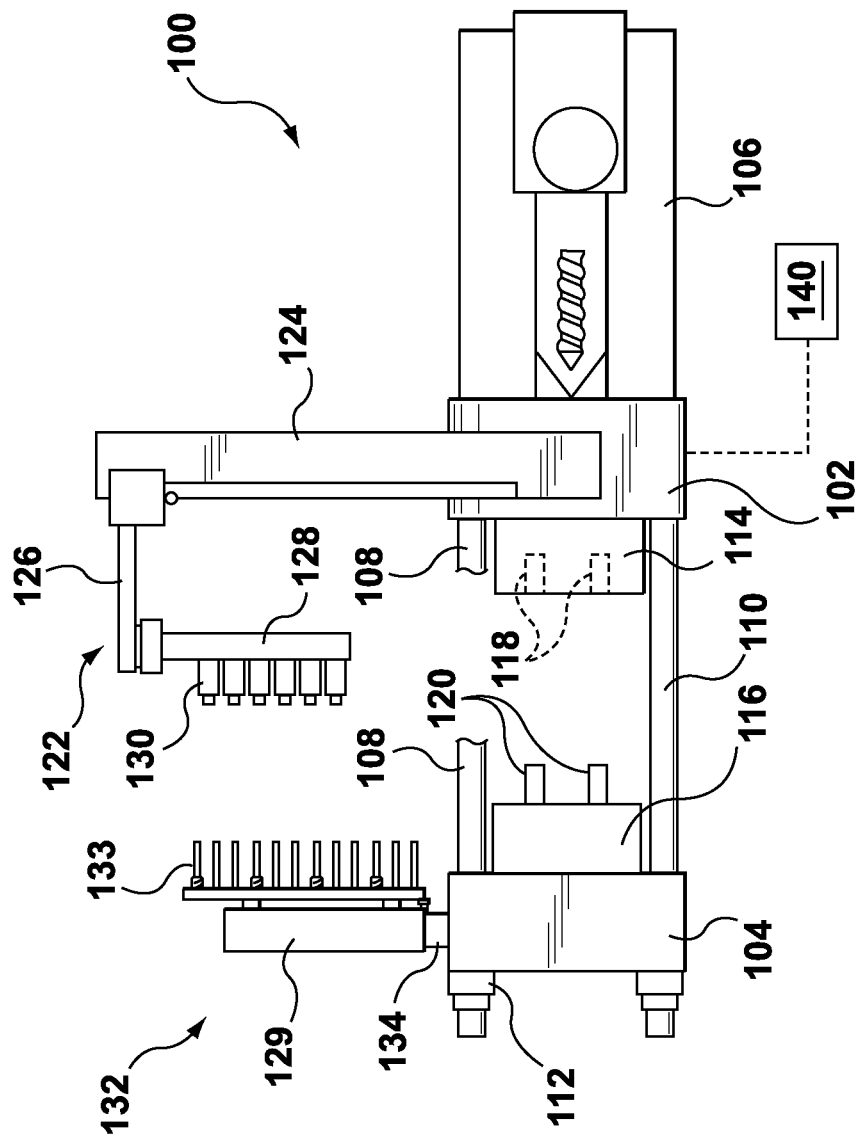
FIG. 22 schematically depicts an injection molding system that can be adapted to implement non-limiting embodiments of the present technology.

With reference to FIG. 22, there is depicted a non-limiting embodiment of a molding system 100 which can be adapted to implement embodiments of the present technology. For illustration purposes only, it shall be assumed that the molding system 100 comprises an injection molding system for processing molding material, such as PET for example, to make preforms that are subsequently molded into final-shaped containers. However, it should be understood that in alternative non-limiting embodiments, the molding system 100 may comprise other types of molding systems, such as, but not limited to, compression molding systems, compression injection molding systems, transfer molding systems, metal molding systems and the like.

It should be further understood that embodiments of the present technology are applicable to the molding system 100 incorporating any multi-cavitation mold for producing any type of preforms.

In the non-limiting embodiment of FIG. 22, the molding system 100 comprises a fixed platen 102 and a movable platen 104. In some embodiments of the present technology, the molding system 100 may include a third non-movable platen (not depicted). Alternatively or additionally, the molding system may include turret blocks, rotating cubes, turning tables and the like (all not depicted but known to those of skill in the art).

The molding system 100 further comprises an injection unit 106 for plasticizing and injection of molding material. The injection unit 106 can be implemented as a single stage or a two-stage injection unit.

In operation, the movable platen 104 is moved towards and away from the fixed platen 102 by means of stroke cylinders (not shown) or any other suitable means. Clamp force (also referred to as closure or mold closure tonnage) can be developed within the molding system 100, for example, by using tie bars 108, 110 (typically, four tie bars 108, 110 are present in the molding system 100) and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a column-based clamping mechanism, a toggle-clamp arrangement (not depicted) or the like.

A first mold half 114 can be associated with the fixed platen 102 and a second mold half 116 can be associated with the movable platen 104. In the non-limiting embodiment of FIG. 22, the first mold half 114 comprises one or more mold cavities 118. As will be appreciated by those of skill in the art, the one or more mold cavities 118 may be formed by using suitable mold inserts (such as a cavity insert, a gate insert and the like) or any other suitable means. As such, the first mold half 114 can be generally thought of as a "mold cavity half".

The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half". Even though not depicted in FIG. 22, the first mold half 114 may be further associated with a melt distribution network, commonly known as a hot runner, for distributing molding material from the injection unit 106 to each of the one or more mold cavities 118. Also, in those embodiments where the molding system 100 is configured to produce preforms, the second mold half 116 can be provided with neck rings (not depicted).

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present technology, the position of the first mold half 114 and the second mold half 116 can be reversed and, as such, the first mold half 114 can be associated with the movable platen 104 and the second mold half 116 can be associated with the fixed platen 102.

In an alternative non-limiting embodiment of the present technology, the fixed platen 102 need not be stationary and may be movable in relation to other components of the molding system 100.

FIG. 22 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art.

It should be appreciated that one of the first mold half 114 and the second mold half 116 can be associated with a number of additional mold elements, such as for example, one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The molding system 100 can further comprise a robot 122 (also referred to as an "end of arm tool") operatively coupled to the fixed platen 102. Those skilled in the art will readily appreciate how the robot 122 can be operatively coupled to the fixed platen 102 and, as such, it will not be described here in any detail. The robot 122 comprises a mounting structure 124, an actuating arm 126 coupled to the mounting structure 124 and a take-off plate 128 coupled to the actuating arm 126. The take-off plate 128 comprises a plurality of molded article receptacles 130.

Generally speaking, the purpose of the plurality of molded article receptacles 130 is to remove molded articles from the one or more mold cores 120 (or the one or more mold cavities 118) and/or to implement post mold cooling of the molded articles. In the non-limiting example illustrated herein, the plurality of molded article receptacles 130 comprises a plurality of cooling tubes for receiving a plurality of molded preforms. However, it should be expressly understood that the plurality of molded article receptacles 130 may have other configurations. The exact number of the plurality of molded article receptacles 130 is not particularly limited.

Schematically depicted in FIG. 22 is the robot 122 of a side-entry type. However, it should be understood that in alternative non-limiting embodiments of the present technology, the robot 122 can be of a top-entry type. It should also be expressly understood that the term "robot" is meant to encompass structures that perform a single operation, as well as structures that perform multiple operations.

The molding system 100 further comprises a post-mold treatment device 132 operatively coupled to the movable platen 104. Those skilled in the art will readily appreciate how the post-mold treatment device 132 can be operatively coupled to the movable platen 104 and, as such, it will not be described here in any detail. The post-mold treatment device 132 comprises a mounting structure 134 used for coupling the post-mold treatment device 132 to the movable platen 104. The post-mold treatment device 132 further comprises a plenum 129 coupled to the mounting structure 134. Coupled to the plenum 129 is a plurality of treatment pins 133. The number of treatment pins within the plurality of treatment pins 133 generally corresponds to the number of receptacles within the plurality of molded article receptacles 130.

The molding system 100 further comprises a controller 140, the controller including a human-machine interface (not separately numbered) or an HMI, for short. Generally speaking, the controller 140 is configured to control one or more operations of the molding system 100. The HMI of the controller 140 can be implemented in any suitable interface. As an example, the HMI of the controller 140 can be implemented in a multi-functional touch screen. An example of the HMI that can be used for implementing non-limiting embodiments of the present technology is disclosed in co-owned U.S. Pat. No. 6,684,264, content of which is incorporated herein by reference, in its entirety.

Those skilled in the art will appreciate that the controller 140 may be implemented using pre-programmed hardware or firmware elements (e.g., application specific integrated circuits (ASICs), electrically erasable programmable read-only memories (EEPROMs), etc.), or other related components. In other embodiments, the functionality of the controller 140 may be achieved using a processor that has access to a code memory (not shown) which stores computer-readable program code for operation of the computing apparatus, in which case the computer-readable program code could be stored on a medium which is fixed, tangible and readable directly by the various network entities, (e.g., removable diskette, CD-ROM, ROM, fixed disk, USB drive), or the computer-readable program code could be stored remotely but transmittable to the controller 140 via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

In alternative non-limiting embodiments of the present technology, the HMI does not have to be physically attached to the controller 140. As a matter of fact, the HMI for the controller 140 can be implemented as a separate device. In some embodiments, the HMI can be implemented as a wireless communication device (such as a smartphone, for example) that is "paired" or otherwise communicatively coupled to the controller 140.

Overview of the Liquid Forming Process

The present technology includes various improvements to methods, apparatuses, and systems for forming final-shaped containers from preforms using a liquid destined to be contained in the final-shaped container. In order to better understand the various improvements that can be achieved by implementing the non-limiting embodiments of the present technology, a generic process of liquid forming of the final-shaped container will now be described with reference to FIGS. 1A and 1B.

The process starts with a preform 50, such as one produced by the molding system 100. The various implementations of the preform 50 will be described in more detail below. The first step includes heating the preform 50 in a heater 21, in order to bring the preform 50 to a temperature where the preform 50 will deform, as is the case when blow-molding. Next, the heated preform 50 is placed in a mold 26 (which can also be thought as a "forming mold"), whose interior surface corresponds to the desired final shape of the final-shaped container to be molded. The mold 26 is implemented as a split mold made of three portions 23 (two mold halves and a base portion), which are configured to be opened and closed (as will be explained in greater detail herein below).

A nozzle 30 is inserted into the preform 50, such that a portion of the nozzle 30 is sealably connected with an opening of the preform 50. Broadly speaking, the nozzle 30 comprises a channel (not depicted) fluidly communicating with an interior of the preform 50 for transmission of the liquid to expand the preform 50 into conformity with the mold 26 and form the container therein. The liquid is supplied via a coupling 32 from a liquid reservoir (not separately numbered).

In some processes, the channel is configured to receive a stretch rod 40 therethrough. In other words, the nozzle 30 is configured to stretch the preform 50 into conformity with the internal surface of the forming cavity of the mold 26:
- by filling an interior of the preform with the liquid through the nozzle 30, pressure of the liquid entering the preform 50 causing the preform 50 to expand; and
- additionally in some embodiments of the present technology, the stretching is assisted by the stretch rod 40.

Once the preform 50 is stretched into the final-shaped container 15 (see FIG. 1B), it is also effectively filled with the liquid that is to be contained in the final-shaped container 15. In this way, the process includes fewer steps in comparison to, for example, blow molding, where forming the final-shaped container 15 and filling the final-shaped container 15 are performed sequentially and not simultaneously. At this point the three mold portions 23 of the mold 26 are separated into a mold opened configuration such that the final-shaped container 15 can be removed therefrom.

The final-shaped container 15 is also capped with a closure 17, the closure being structured and configured based on the liquid contained in the final-shaped container 15. As is known, closure 17 used for non-carbonated beverage is implemented differently form the closure used for a carbonated beverage or a hot fill beverage (such as a drinkable yogurt, for example).

In order to implement the non-limiting embodiments of the present technology, the liquid that is used for liquid forming is a product to be contained in the final-shaped container. In some non-limiting embodiments, the product is a beverage (such as still water beverage, juice, or the like). In other embodiments, the product can be a drinkable yogurt. In other non-limiting embodiments of the present technology, the product is not for human consumption and can be, for example, liquid glue, paint, shampoo or the like.

Description of a Preform

Figure 2:
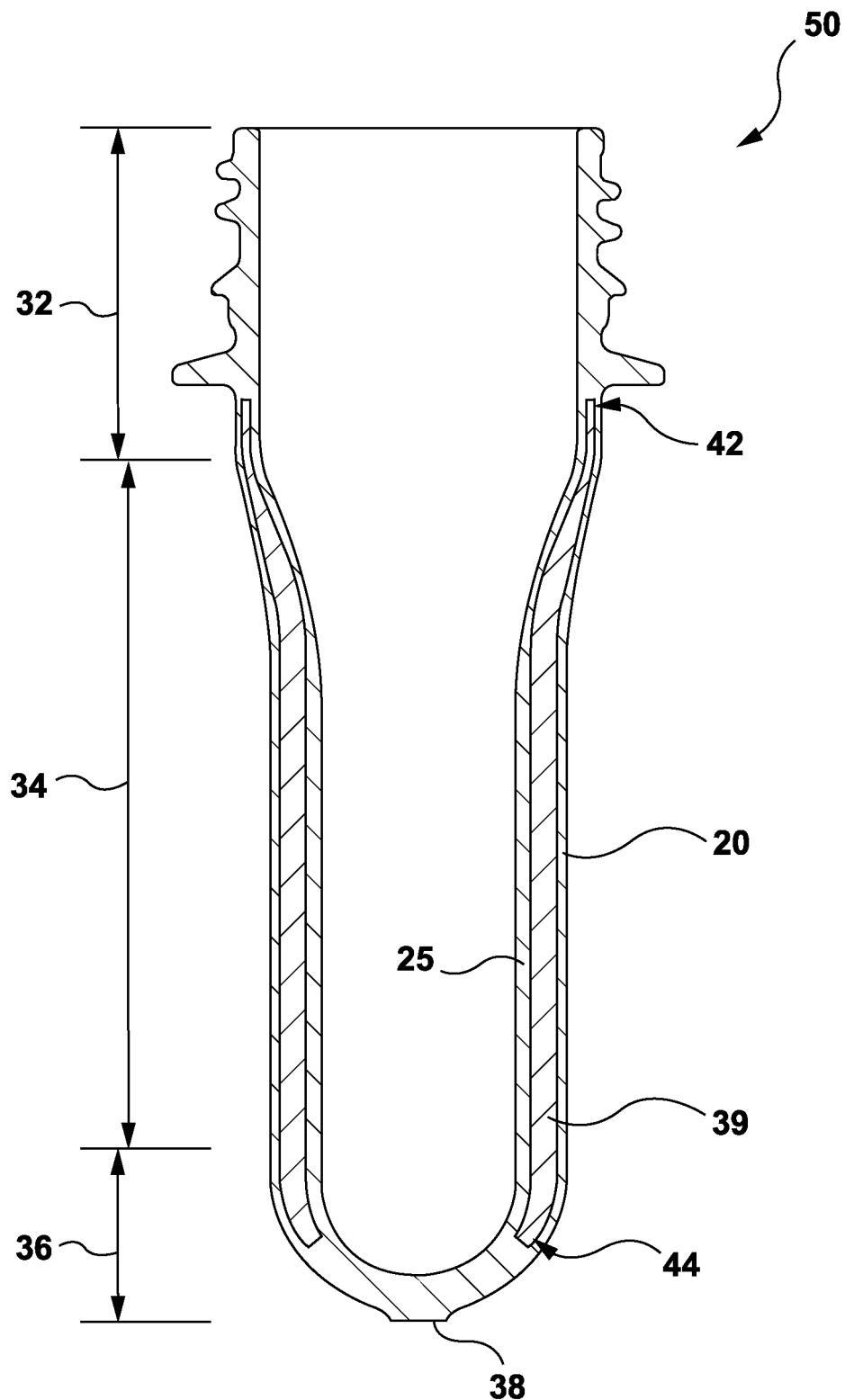
FIG. 2 is a cross-sectional view of a preform as known in the prior art.

With reference to FIG. 2, there is depicted a conventional preform 50, produced by the molding system 100, as an example. The prior art preform 50 is described herein to provide a general structure of a molded article suitable for subsequent liquid molding; specifics of molded articles according to the present technology will be described in more detail below. It should be recalled that the molding system 100 can be implemented as any type of molding machine and, therefore, it is contemplated that the preforms 50 could be produced any type of the molding system 100 (such as injection molding machine, injection compression molding machine, transfer molding and the like).

The preform 50 consists of a neck portion 32, a gate portion 36 and a body portion 34 extending between the neck portion 32 and the gate portion 36. The gate portion 36 is associated with a substantially spherical shape that terminates in a vestige portion 38. Naturally, the gate portion 36 can be executed in another form-factor (such as substantially conical, frusto-conical or the like). The body portion 34 of the preform 50 can be of a single layer or of a multi-layer structure. In the illustration of FIG. 2, the preform 50 is depicted of a multi-layer configuration, namely of a three layer configuration. The three layer configuration of the preform 50 is presented as one example implementation of a preform. Various aspects of the present technology may be applicable to multi-layer configurations of the preform 50, while other aspects may be more applicable to preforms constructed from two or one layers of material.

On exterior sides, the body portion 34 has an outer exterior skin layer 20 and an inner exterior skin layer 25. The skin layers 20, 25 can be made of various materials. For example, in multilayer preforms 50 for making beverage containers, the skin layers 20, 25 are made of virgin polyethylene terephthalate (PET), which is approved by the FDA for use in contact with foodstuffs. It is contemplated that the skin layers 20, 25 could be made of various other materials, including any appropriate polymer resins and thermoplastics, as will be appreciated by those skilled in the art.

The skin layers 20, 25 surround a core layer 39. The core layer 39 is generally made of a different material, or a different state of the same material, than the skin layers 20, 25. At a top end of the preform 50, the core layer 39 begins at a leading edge 42. At the gate portion of the preform 50, the core layer 39 terminates at a trailing edge 44. It is contemplated that, in some alternative implementations of the preform 50, the core layer 39 may extend through the gate portion 36 to form a closed dome formation.

As will be described in part below, the core layer 39 is used to impart different properties to the preforms 50. The core layer 39, in some embodiments, can act as a barrier layer in the eventual blow-molded container blown from the preform 50. In such cases, the barrier layer can help to prevent transmission of, for example, oxygen or light into an interior of the blow-molded container. The core layer 39 can also be made from any one of various appropriate thermoplastics and polymer resins as will be appreciated by those skilled in the art. It is contemplated that the core layer 39 could also contain various additives, coloring, or property adjusting agents to affect different properties of the preform 50.

Description of a Preform and a Stretch Rod (Forming a Seal)

Figure 3:
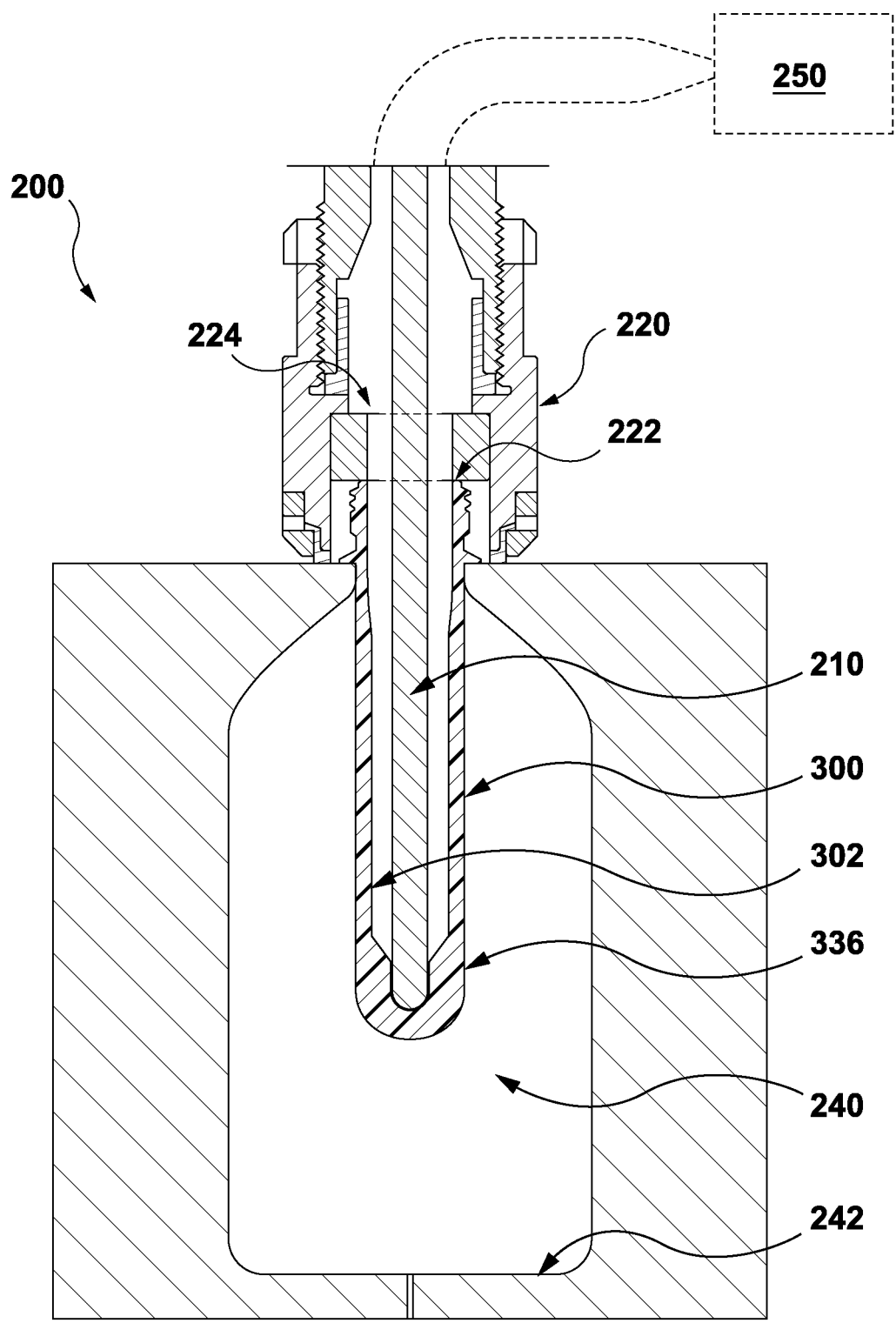
FIG. 3 depicts a side, cross-sectional schematic view of a preform and a forming machine according to one non-limiting embodiment of the present technology.
Figure 4A:
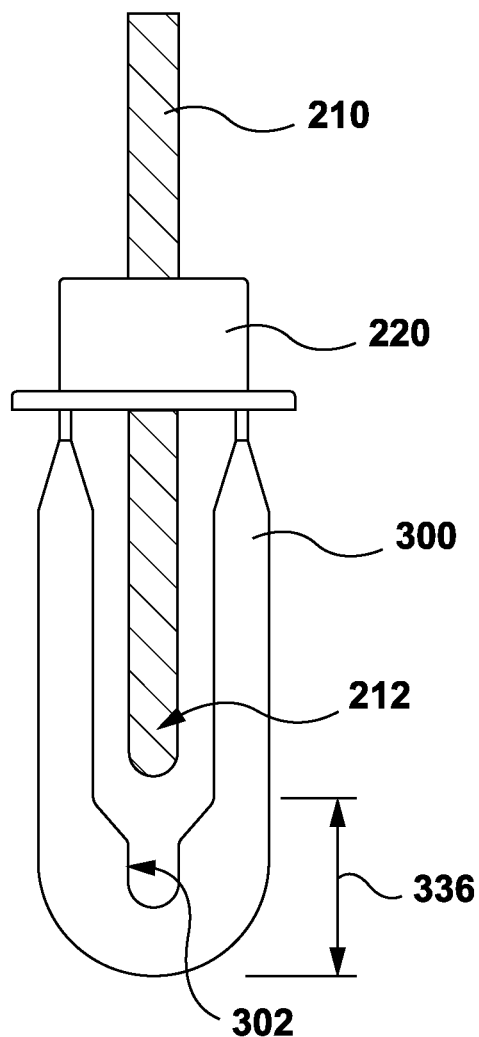
FIGS. 4A-4B depict side, cross-sectional schematic views of the preform and a stretch rod of the forming machine of FIG. 3.
Figure 4B:
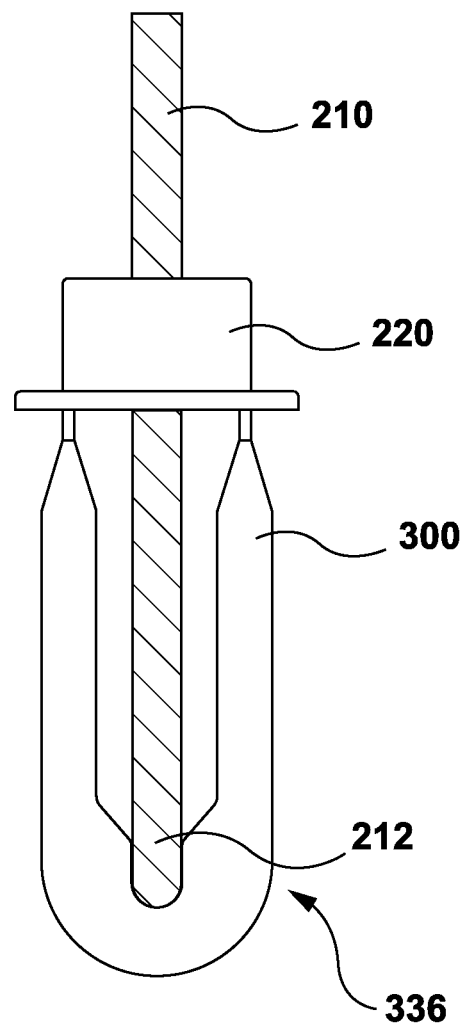

With reference to FIGS. 3 to 4B, an apparatus 200, a method 500, and a process for simultaneous forming and filling a final-shaped container according to some non-limiting embodiments will now be described. The apparatus 200 can also be referred to herein below as a "forming apparatus". a "forming machine" or a "forming system".

FIG. 3 depicts a mold cavity 240 having the internal surface 242. The mold cavity 240 is also referred as the "container cavity" and is shaped to the desired shape of the final-shaped container 15. The mold cavity 240 is implemented as a split mold in a sense that it is made of two complementary halves (not separately numbered), which are actuatable together (into a closed configuration of FIG. 3) and apart (into an open configuration, which is not depicted).

Positioned within the mold cavity 240 is a preform 300, the preform 300 having an internal surface 302 (also sometimes called an internal skin 302). The preform 300 is depicted in the just molded state, prior to the preform being shaped into the final-shaped container 15.

There is also depicted a nozzle assembly 220 configured to implement non-limiting embodiments of the present technology. The nozzle assembly 220 comprises a TSS seal member 222 for sealing with a Top Sealing Surface (TSS) of the preform 300, which is not separately numbered. The nozzle assembly 220 defines a channel 224 fluidly coupled to a liquid reservoir 250 for receiving liquid therefrom. In the in-use position, the channel 224 is also fluidly communicating with an interior of the preform 300, into which the nozzle assembly 220 is positioned. The channel 224 is configured to receive a stretch rod 210 therethrough.

Within the depicted embodiment, a portion of the preform geometry and the stretch rod 210 are configured to cooperate to least partially isolate a gate portion of the preform 300 from contacting the liquid that is used for liquid forming. With specific reference to FIG. 4A, the preform 300 comprises a lower portion 336. The lower portion 336 generally corresponds to a portion of the preform defined by a gate insert of the molding system 100 (in which case the lower portion 336 can, but does not have to, correspond to the gate portion of the preform 300). To that end the lower portion 336 starts at the gate nub (not separately numbered) and terminates at a transition point between the gate portion and the body portion.

In the illustrated embodiment, the lower portion 336 is associated with a smaller inner diameter compared to the inner diameter of the body portion of the preform 300.

The inner diameter of the lower portion 336 is configured to cooperate with a lower portion 212 of the stretch rod 210 to seal the lower portion 336 of the preform 300 from being in contact with the liquid during certain portions of the liquid forming process of the preform 300 into the final-shaped container. In some embodiments of the present technology, the inner diameter of the lower portion 336 and the lower portion 212 of the stretch rod 210 are dimensioned in a size-on-size relationship (as is best seen in FIG. 4B).

It is noted that the seal described above between the preform inner skin and the stretch rod 210 does not need to be water tight (i.e. some leakage may occur). The seal is above all configured to retard pressurization/cooling of the lower portion 336. As such the seal may thought as an 'obstruction' that isolates the downstream portion from premature pressurization and/or cooling.

In some embodiments of the present technology, the stretch rod 210 can be provided with an additional sealing member (such as an O-ring or the like) to assist in sealing.

It is noted that the exact placement of the sealing/obstructing is not particularly limited. In the depicted embodiments, it is placed at a transition between the gate portion and the body portion of the preform 300 (as well as along the entirety of the lower portion 336), but this does not need to be so in every alternative embodiment of the present technology. The seal location may be defined by a transition to a thickened region of the base/body, wherein the additional material, relative to the remainder of the preform 300 for liquid forming, ensures that a base of the final-shaped container is adequately formed (i.e. is not too thin or too quickly cooled to be fully formed).

Figure 13:
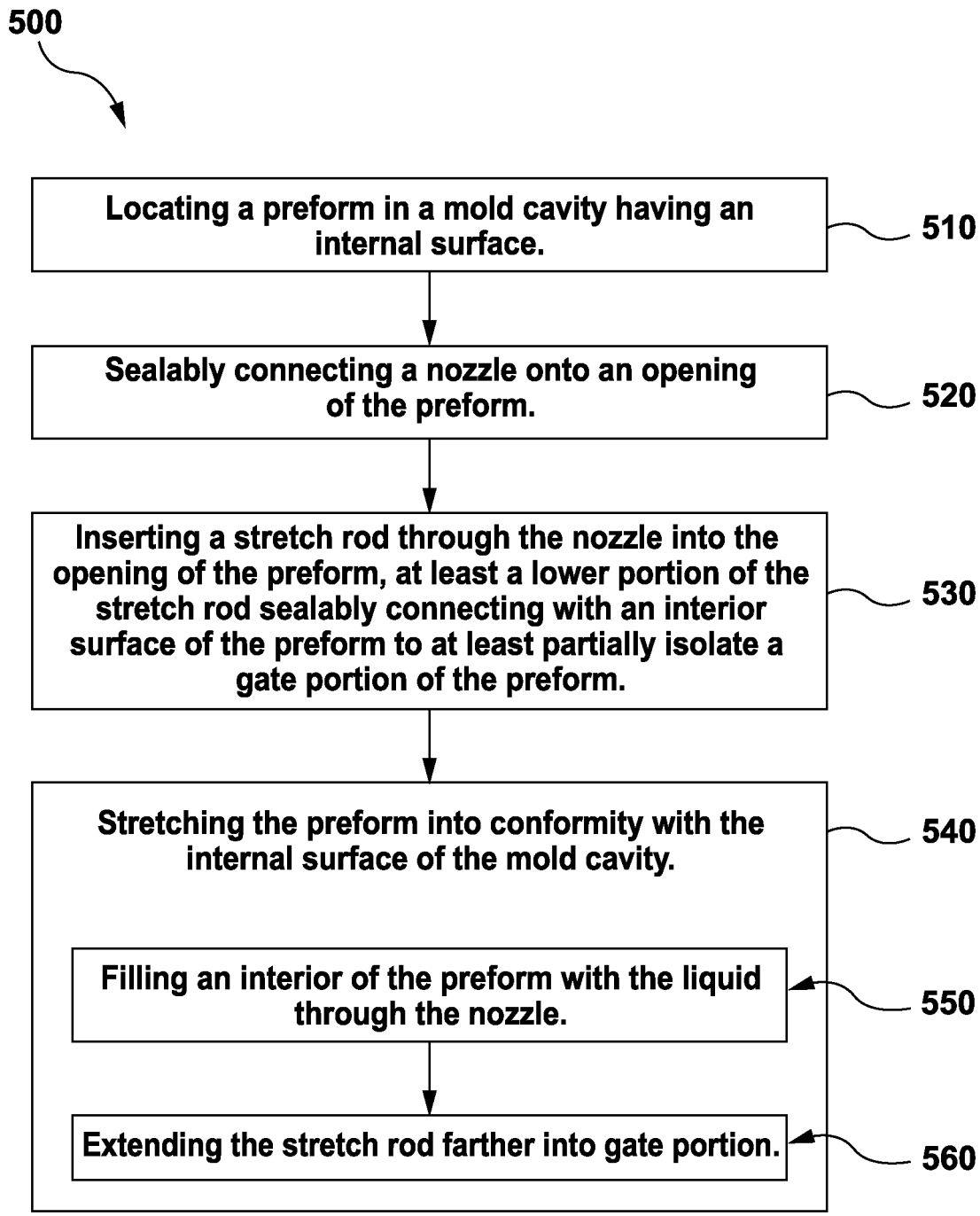
FIG. 13 is a schematic flow chart of a non-limiting embodiment of a method according to the present technology.

In accordance with some non-limiting embodiments of the present technology, the process of simultaneous forming and filling a final-shaped container can be implemented as follows. With reference to FIG. 13, there is depicted a flow chart of a method 500 implemented in accordance with some non-limiting embodiments of the present technology. The method 500 can be implemented under control of the controller 140.

Step 510

Locating the preform 300 in the mold cavity 240 having the internal surface 242.

Step 520

Sealably connecting the nozzle assembly 220 onto an opening of the preform 300.

Step 530

Inserting the stretch rod 210 through the nozzle assembly 220 into the opening of the preform 300, at least the lower portion 212 of the stretch rod 210 sealably connecting with the internal surface 302 of the preform 300 to at least partially isolate the lower portion 336.

Step 540

Stretching the preform 300 into conformity with the internal surface 242 of the mold cavity 240 by:

at substep 550—filling an interior of the preform 300 with the liquid through the nozzle assembly 220, and at substep 560—extending the stretch rod 210 farther into the lower portion 336.

In some embodiments of the present technology, the substep 550 at least partially overlaps with the substep 560. In some embodiments of the present technology, the substep 560 commences at a pre-determined point of time after the step 550 commences.

Figure 5A:
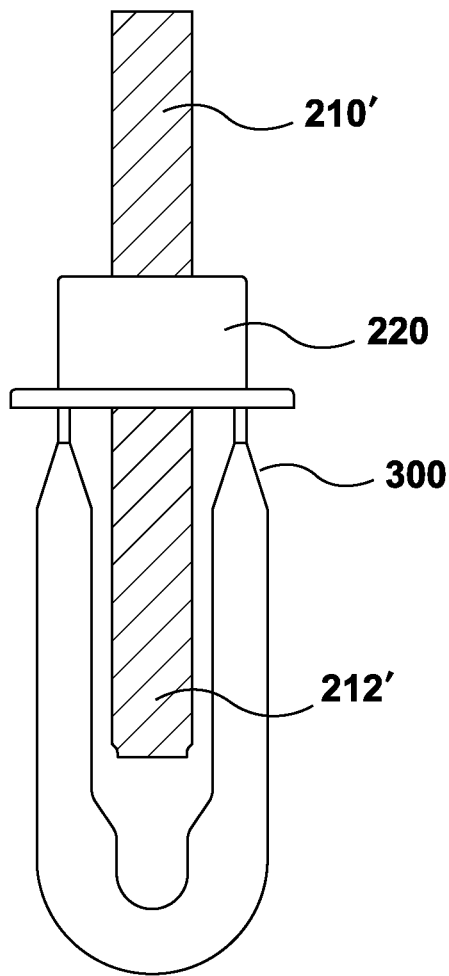
FIGS. 5A-5B depict side, cross-sectional schematic views of the preform and a stretch rod in accordance with another non-limiting embodiment of the present technology.
Figure 5B:
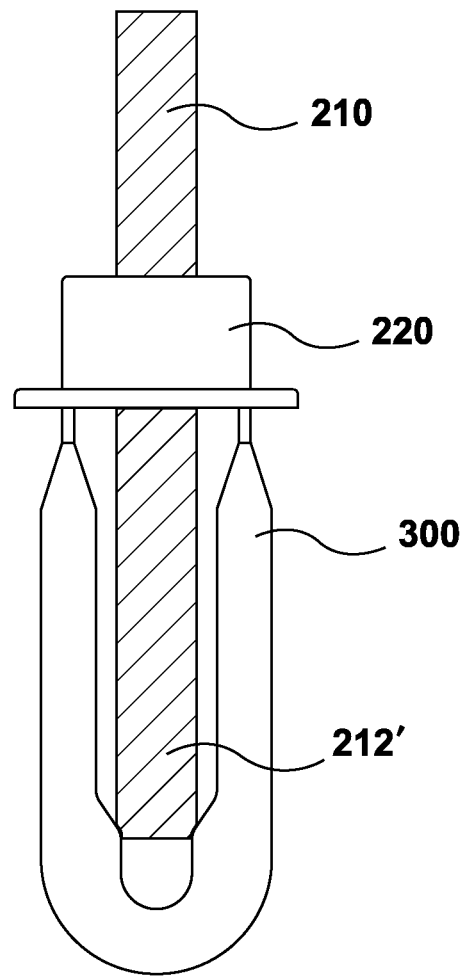

With reference to FIGS. 5A-5B, another embodiment of a stretch rod 210' will be described. In accordance with these alternative embodiments, the stretch rod 210' comprises scalloped geometry at a lower extreme of the lower portion 212' thereof. As is better shown in FIG. 5B, the scalloped geometry of the stretch rod 210' cooperates with the inner radius of the lower portion 336 of the preform 330 to provide the sealing to isolate the gate portion of the preform 330 from the liquid.

Therefore, by considering embodiments of FIGS. 4A-4B and FIGS. 5A-5B, it can be said that the geometry of at least one of the lower portion 336 of the preform 330 and the stretch rod 210, 210' are configured to isolate the gate portion of the preform 330 from the liquid. The illustrated geometries of FIGS. 4A 5B as simply presented as non-limiting examples, and are not intended to limit the possible geometries that fall within the scope of the present technology. Various shapes of the stretch rod 210 and the preform 300 are contemplated. As illustrated, a portion of the inner surface 302 extends inward and configured for sealably connecting with the stretch rod 210, 210'.

Figure 6:
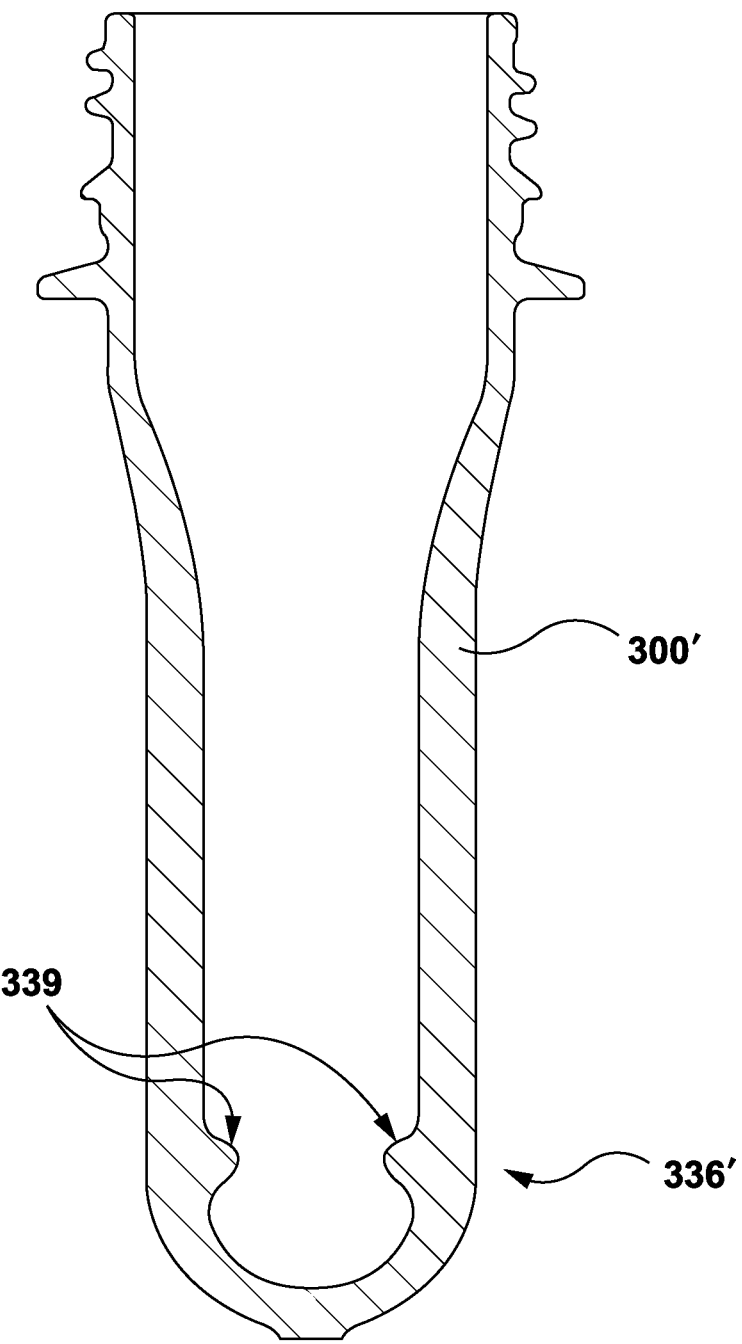
FIG. 6 depicts a side, cross-sectional schematic view of a preform in accordance with another non-limiting embodiment of the present technology for use with the stretch rod of FIG. 3.

In accordance with yet another non-limiting embodiment of the present technology illustrated in FIG. 6, a preform 300' can be used in place of the preform 300.

The preform 300' includes a protrusion 339 defined in a lower portion 336' for forming a seal with the stretch rod 210. The protrusion 339 extends inward from the internal surface 302, the protrusion being configured for creating a seal with a stretch rod 210 inserted into the preform 300 during the simultaneous forming and filling. The illustrated protrusion 339 is simply an example of a form that the protrusion 339 could take. It is contemplated that the protrusion 339 could be larger, smaller, or differently shaped. The specific implementation of the shape of the protrusion 339 will depend inter alia on the size of the preform 300', the pressure of the liquid used for liquid forming, the size of the final-shaped container and the like.

In accordance with the illustrated embodiment of the present technology, the protrusion 339 is located near a boundary between the gate portion and the body portion of the preform 300. However, in alternative non-limiting embodiments of the present technology, the stretch rod 210 could include a protrusion similar to the protrusion 339, located to align with one of: the boundary between the body portion and the gate portion, and a region of the internal surface 302 extending from the boundary towards a gate nub portion of the lower portion 336'.

Description of a Stretch Rod with a Heatable Tip

Figure 7A:
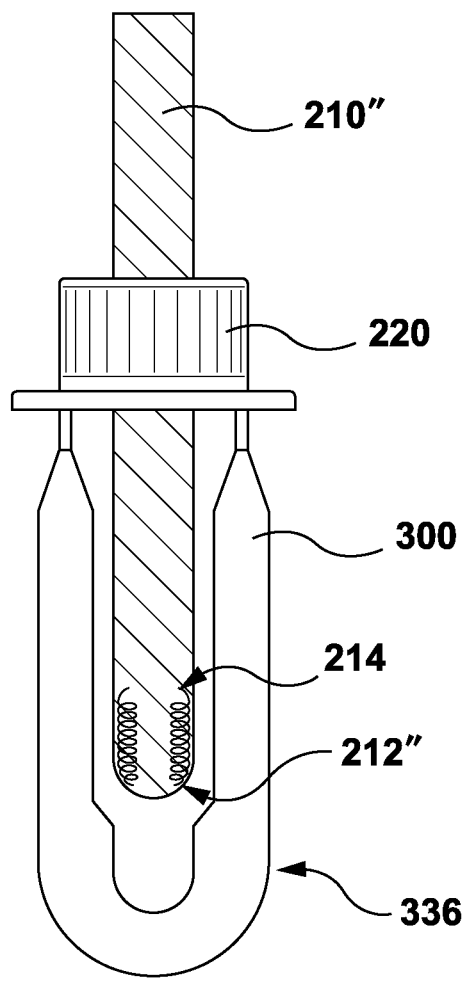
FIGS. 7A-7B depict side, cross-sectional schematic views of the preform of and a stretch rod of the forming machine of FIG. 3 in accordance with another non-limiting embodiment of the present technology.
Figure 7B:
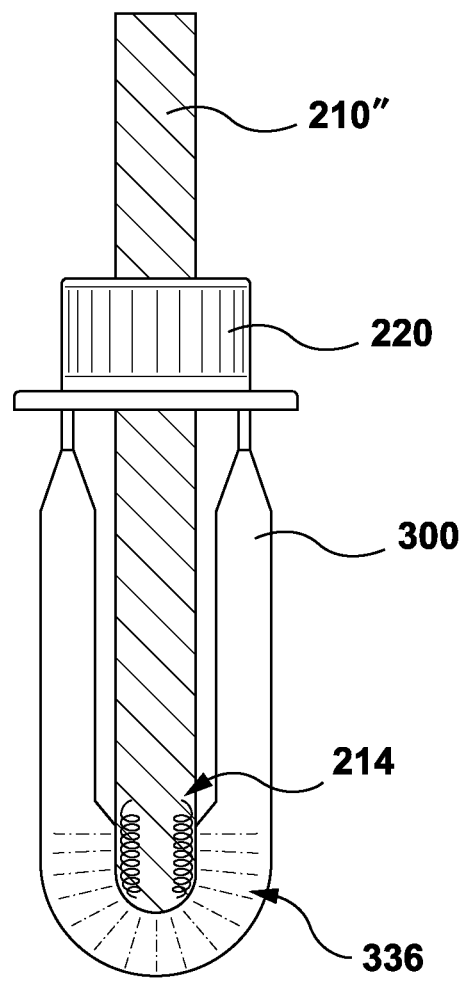

With reference to FIGS. 7A and 7B, another embodiment of a stretch rod 210" will be described. The stretch rod 210" can be used in place of the stretch rod 210, but remaining portions of the apparatus 200 remain unchanged and will not be described again here.

The stretch rod 210" can be used in conjunction with the preform 300, described above. The stretch rod 210" includes a heater 214 disposed in a tip 212". The tip 212" sealingly engages with internal surface 302 (see, for example, FIG. 7B). The heater 214 (that defines a selectively heatable tip of the stretch rod 210") comprises an internal resistor for causing at least a lower portion of the stretch rod 210" to heat. By heating the lower portion 336 of the preform 300, the stretch rod 210" can aid in preventing the lower portion 336 from pressurization and/or cooling prematurely.

It is also contemplated that the stretch rod 210" could be used with the traditional preform 50, where the stretch rod 210" could also include additional structures for creating a seal with the preform 50.

In some non-limiting embodiments of the present technology, the stretch rod 210, 210" can define at least one channel fluidly communicating with an interior of the preform and a pressurized air source, the stretch rod 210, 210" being configured for partial blow-molding of the preform prior to transmission of the liquid.

Description of a Stretch Rod with a Deformable Member and a Method Using Same

Figure 8:
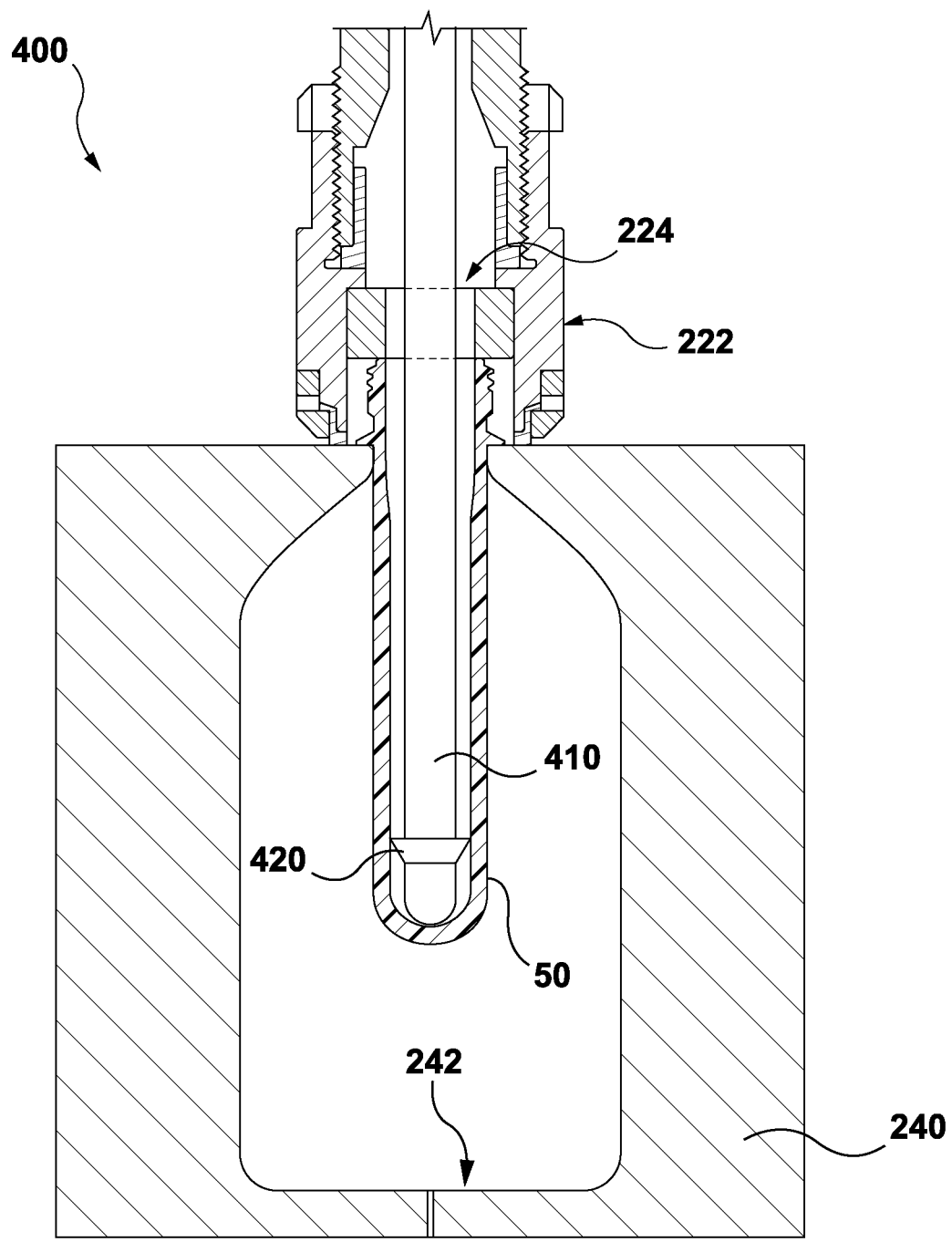
FIG. 8 depicts a side, cross-sectional schematic view of the preform of FIG. 2 and a forming machine according to another non-limiting embodiment of the present technology.

With reference to FIGS. 8 to 9B, another non-limiting embodiments of an apparatus 400 for simultaneously forming and filling the final-shaped container 15 from the preform 50 using the liquid product will now be described. It is contemplated that the preform 300 could equally by used with the apparatus 400. It is noted that other preform configurations can also be used.

In the embodiment illustrated, there is a stretch rod 410 including a deformable member 420. Broadly speaking, the deformable member 420 is configured to at least partially isolate the gate portion of the preform 50 from the liquid during appropriate portions of the liquid forming of the preform 50 into the final-shaped container 15. Broadly speaking, the deformable member 420 can be made at least in part from a thermally isolating material. In other words, the deformable member 420 can be made at least on part from a material having low thermal conductivity. As an example, the deformable member 420 can be from a polymer or rubber.

In the depicted illustration, the deformable member is implemented as a rubber cup 420 disposed about a lower portion 412 of the stretch rod 410. The rubber cup 420 extends radially from the lower portion 412 of the stretch rod 410.

The rubber cup 420 is depicted in a collapsed (or disengaged) configuration in FIG. 8 and FIG. 9A and in an extended (or engaged) configuration in FIG. 9B. In the disengaged configuration, the deformable member is dimensioned to pass through a neck opening of the preform 50 (from outside of the preform 50, through the opening in the neck of the preform 50 and into the body of the preform 50). In the engaged configuration, the rubber cup 420 is configured to engage the inner surface of the preform 50 to at least partially isolate the gate portion 36 of the preform 50 from the liquid during appropriate portions of the liquid forming of the preform 50 into the final shaped-container 15.

In some non-limiting embodiments of the present technology, the actuation of the rubber cup 420 between the collapsed (or disengaged) configuration in FIG. 9A and the extended (or engaged) configuration in FIG. 9B can be implemented as follows.

When filling an interior of the preform 50 with the liquid through the nozzle assembly 220, the liquid causes the deformable member 420 to extend out from the stretch rod 410 to contact the interior surface of the preform 50 to form a temporary seal to at least partially isolate the gate portion 36 from the liquid.

The rubber cup 420 is repositionable, between the disengaged configuration and the engaged configuration, by the pressure of the liquid filling the interior of the preform 50. The return of the rubber cup 420 from the engaged configuration to the disengaged configuration is executed in response to a decrease of the pressure of the liquid filling the interior of the preform.

It is noted that in alternative non-limiting embodiments of the present technology, the deformable member 420 can be implemented in any other shape, such as a collapsible umbrella shape, as an example. The deformable member 420 can be made of any suitable material, such as an elastomeric material. One material consideration when selecting the material for the deformable member 420 is flexibility and pressure resistance. Alternatively, the deformable member 420 can be made of, or include, metal components that "wing out" from the collapsed configuration to the extended configuration.

Alternative Implementation—Controllably-Extendible Sealing Member

Figure 10:
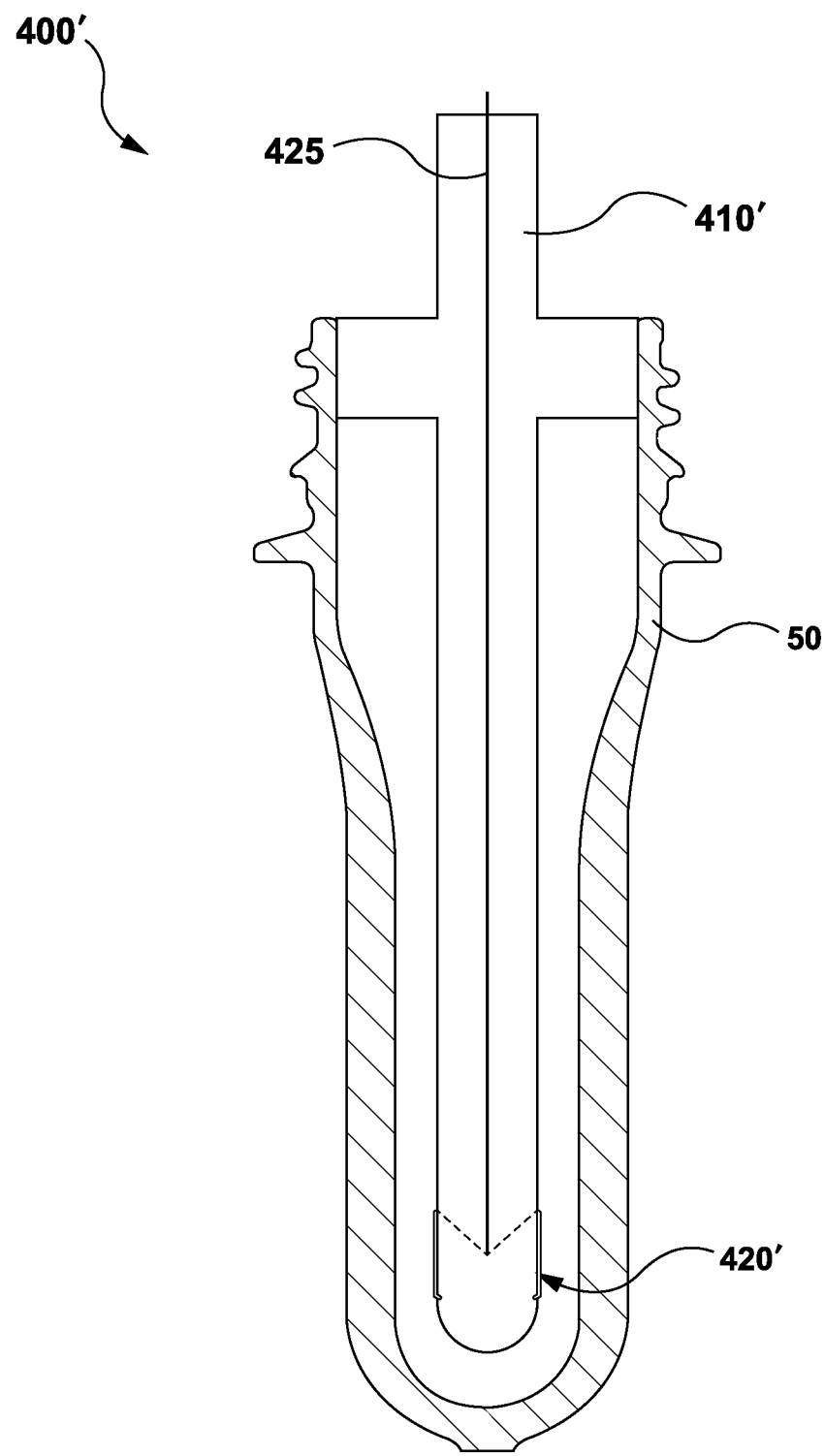
FIGS. 10 and 11 depict side, cross-sectional schematic views of the preform of FIG. 2 and a stretch rod in accordance with another non-limiting embodiment of the present technology.
Figure 11:
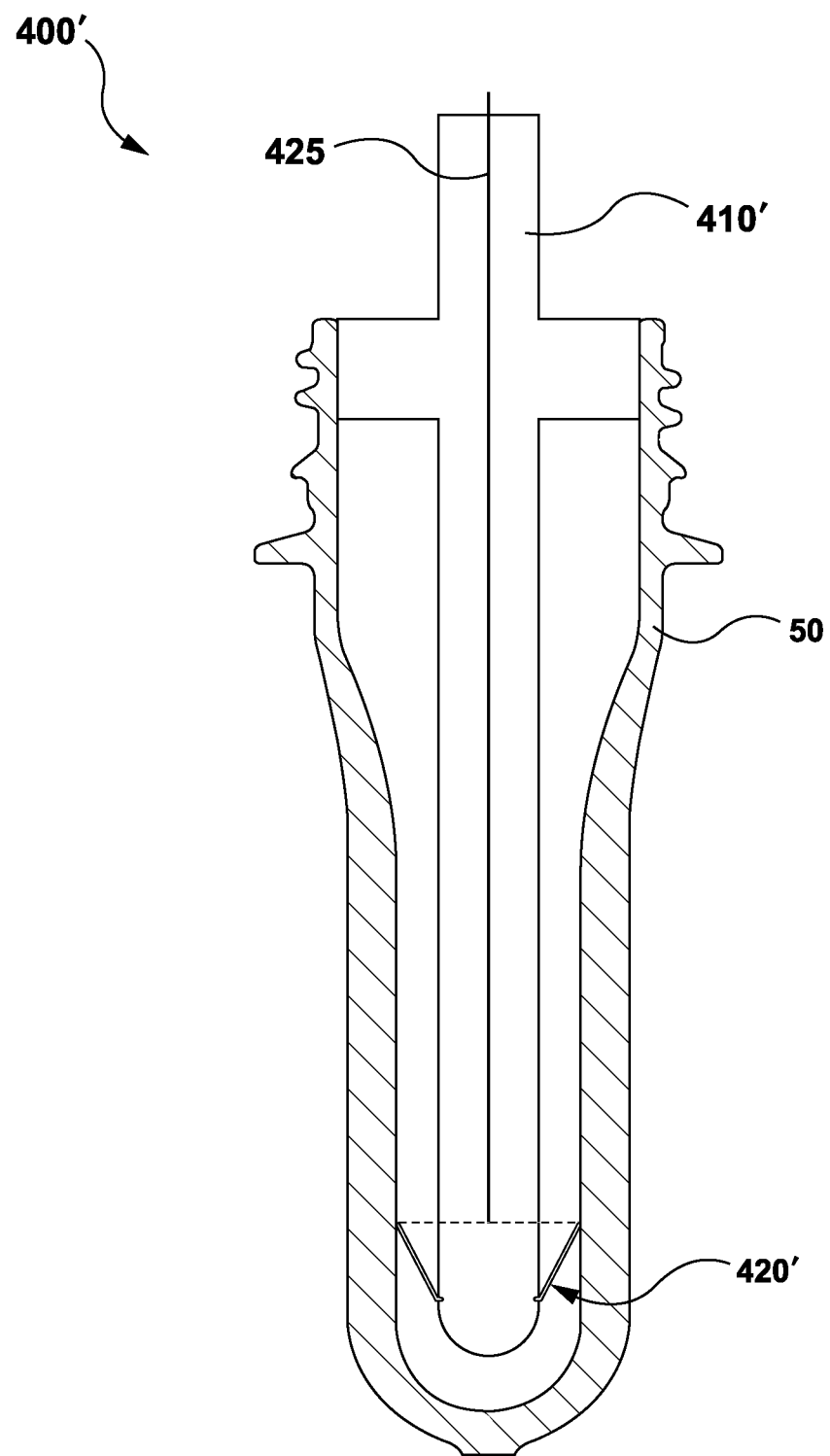

With reference to FIGS. 10 and 11, an apparatus 400' for simultaneously forming and filling the final-shaped container 15 from the preform 50 using the liquid product will now be described. It is again contemplated that the preform 300, as well as other preform configurations, could equally by used with the apparatus 400'.

The apparatus 400' comprises a stretch rod 410'. The stretch rod 410' comprises a controllably-extendible sealing member 420' disposed around a lower portion thereof. The controllably-extendible sealing member 420' is another embodiment for implementing the sealing member 420. Thus, the operation of the controllably-extendible sealing member 420' and the stretch rod 410' is substantially similar to that of the stretch rod 410, but for the specific differences described herein below. The controllably-extendible sealing member 420' can be thought of as an "actively controllable" controllably-extendible sealing member 420' in the sense that it is controlled by a controller for controlled reconfiguration between the disengaged and the engaged configurations.

The controllably-extendible sealing member 420' is configured to selectively and at least partially isolate the gate portion of the preform from the liquid. To that end, the controllably-extendible sealing member 420' is configured to be actuated from the collapsed configuration of FIG. 10 to an engaged configuration of FIG. 11, where the controllably-extendible sealing member 420' contacts the interior surface of the preform 50 to form a temporary seal for at least partially isolating the gate portion 36. Broadly speaking, as with the deformable member 420, the controllably-extendible sealing member 420' can be made at least in part from a thermally isolating material. Other materials can of course also be used to implement the controllably-extendible sealing member 420'.

In embodiments of the present technology, the controllably-extendible sealing member 420' is actuated by the controller 140 operatively connected to the stretch rod 410' via an electric coupling 425. It is contemplated that in some embodiments the controllably-extendible sealing member 420' could be actuated by a rod-in-rod mechanical control system.

Alternative Implementation—Controllably-Inflating Sealing Member

Figure 12:
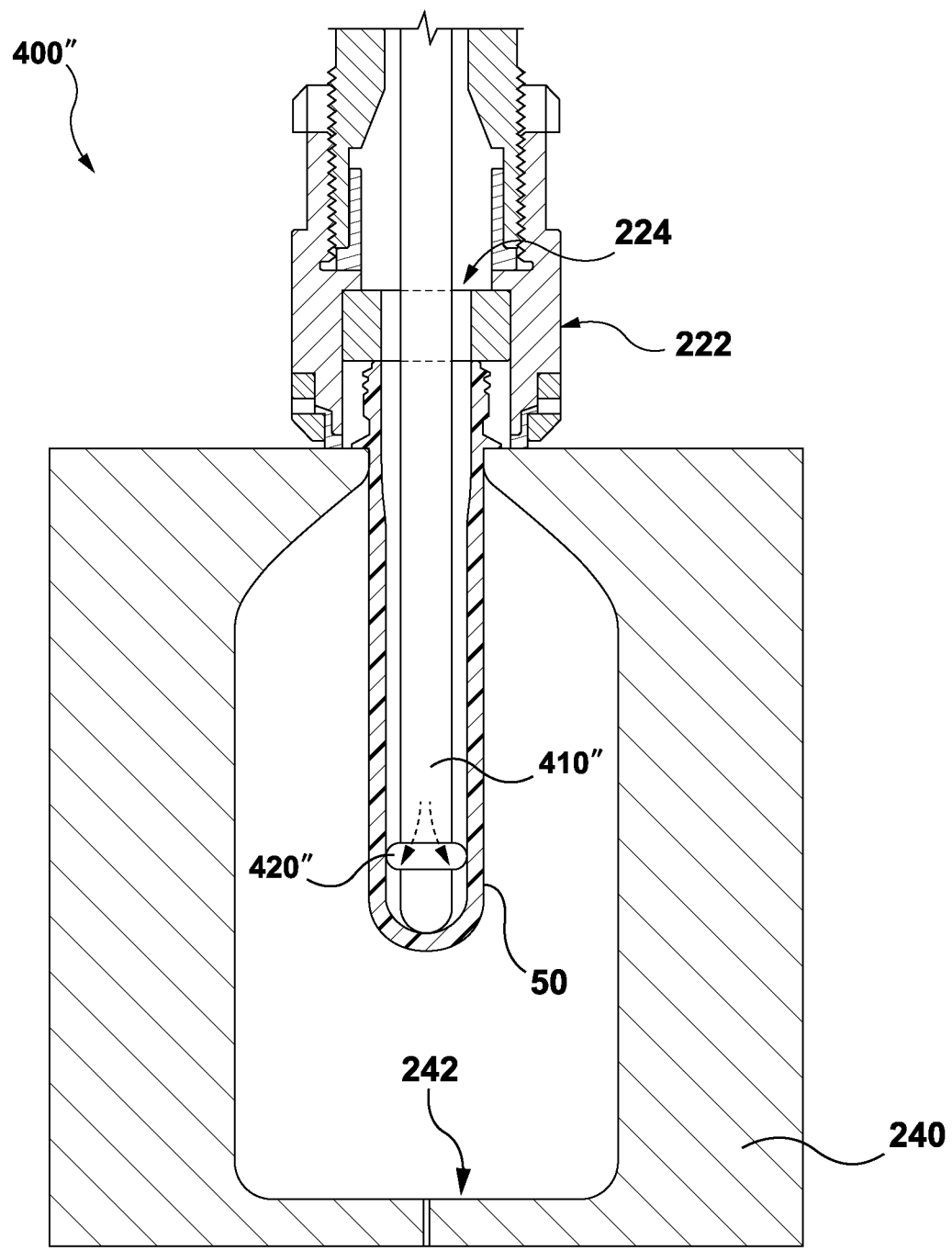
FIG. 12 depicts a side, cross-sectional schematic view of the preform of FIG. 2 and a forming machine according to another non-limiting embodiment of the present technology.

With reference to FIG. 12, an apparatus 400" for simultaneously forming and filling the final-shaped container 15 from the preform 50 using the liquid product will now be described. It is again contemplated that the preform 300, as well as other preform configurations, could equally by used with the apparatus 400".

The apparatus 400" comprises a stretch rod 410". The stretch rod 410" comprises a controllably-deformable sealing member 420" disposed around a lower portion thereof. The controllably-deformable sealing member 420" is another embodiment for implementing the sealing member 420. Thus, the operation of the controllably-deformable sealing member 420" and the stretch rod 410" is substantially similar to that of the stretch rod 410, but for the specific differences described herein below. The controllably-deformable sealing member 420" can be thought of as an actively controllable controllably-deformable sealing member 420" in the sense that it is controlled by a controller for controlled reconfiguration between the disengaged and the engaged configurations.

The controllably-deformable sealing member 420" is configured to selectively and at least partially isolate the gate portion of the preform from the liquid. The controllably-deformable sealing member 420" is specifically a rubber air bladder 420" disposed about the stretch rod 410" in the illustrated embodiment. In other embodiments, the rubber air bladder 420" can be made from or include different materials.

To that end, the controllably-deformable sealing member 420" is configured to be actuated from a collapsed configuration (not shown) to an engaged configuration of FIG. 12, where the controllably-deformable sealing member 420" contacts the interior surface of the preform 50 to form a temporary seal for at least partially isolating the gate portion 36. The sealing member 420" is actuated from the disengaged (collapsed) configuration to the engaged configuration by inflating the sealing member 420" by air injected into the sealing member 420" through channels (not shown) in the stretch rod 410".

Broadly speaking, as with the deformable member 420, the controllably-deformable sealing member 420" can be made at least in part from a thermally isolating material. Other materials can of course also be used to implement the controllably-deformable sealing member 420".

Base Portion Heat Layer

Figure 14A:
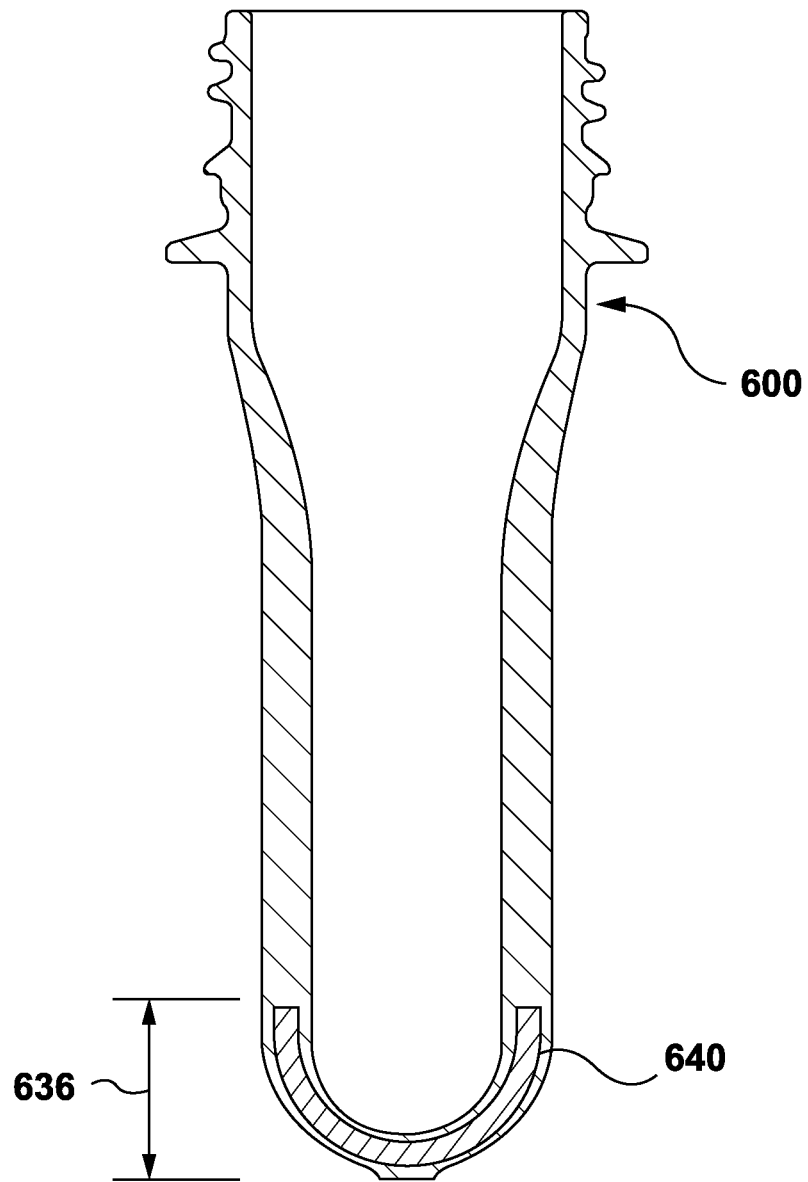
FIG. 14A is a side, cross-sectional schematic view of a preform according to another non-limiting embodiment of the present technology.
Figure 14B:
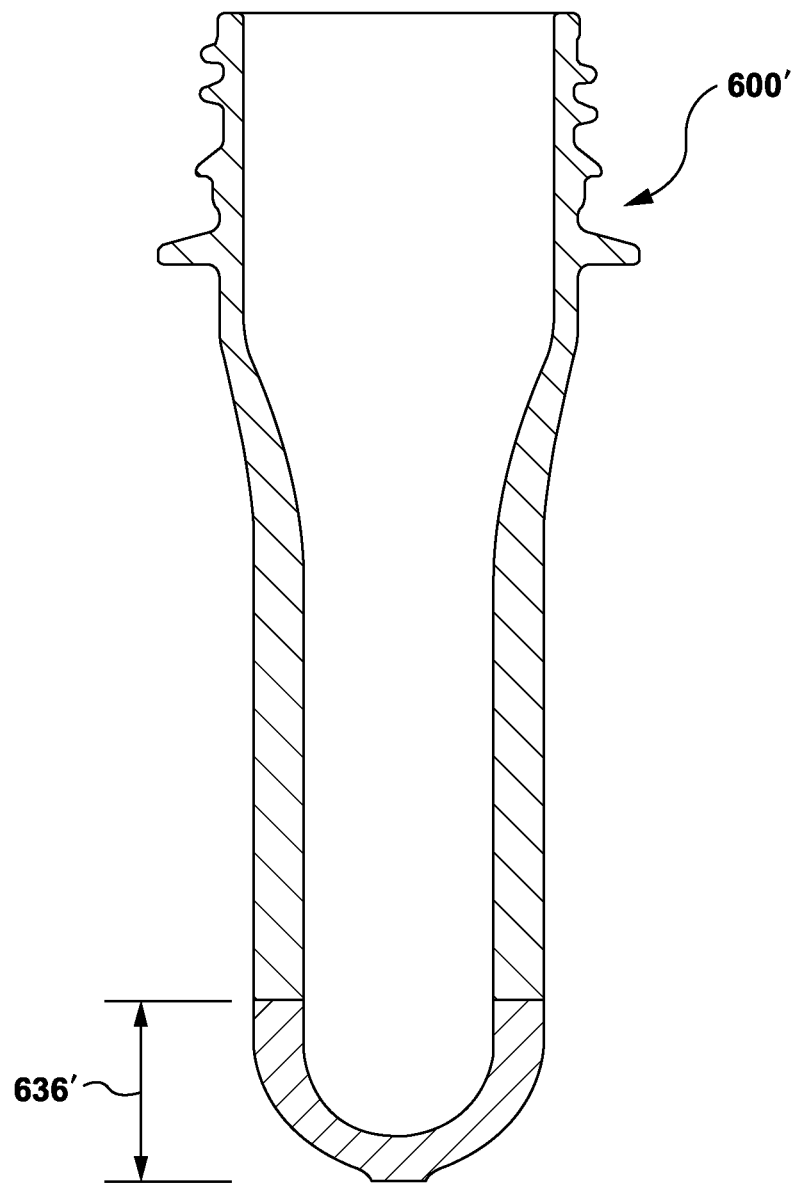
FIG. 14B is a side, cross-sectional schematic view of a preform according to yet another non-limiting embodiment of the present technology.

With reference to FIGS. 14A and 14B, additional embodiments of a preform 600 and a preform 600' for use in a system for forming and filling the final-shaped container 15 using the liquid product to be contained in the final-shaped container 15 is depicted. In the embodiment illustrated in FIG. 14A, a core layer 640 is defined only in a gate portion 636 of the preform 600. However, it is contemplated that the core layer 640 could extend through more or less of the cross section of the preform 600. For example, it is contemplated that the core layer 640 could extend through at least a portion of the body portion of the preform 600 and/or through at least a portion of the neck portion of the preform 600. It is also contemplated that the preform 600 could include additional core layers, such as the core layer 39 of preform 50, in addition to the core layer 640 depicted in the illustrated embodiment.

The core layer 640 includes a thermally isolating material configured to slow the thermal cooling rate of the gate portion 636. In this way, the gate portion 636 need not necessarily be isolated (but can be) from the liquid during the molding process, but instead the material properties of the gate portion 636 itself slows the cooling of the preform 600.

Although illustrated in the core layer 640, it is contemplated that the thermally isolating material could be disposed in the inner or outer layers of a multilayer preform, such as the preform 50.

As is illustrated in FIG. 14B, another embodiment of the preform 600' includes a gate portion 636' composed entirely of the thermally isolating material configured to slow the thermal cooling rate of the gate portion 636'. In this way, the gate portion 636' need not necessarily be isolated from the liquid during the molding process, but instead the material properties of the gate portion 636' itself slows the cooling of the preform 600'.

Base Portion Heat-Absorption Layer

Figure 15:
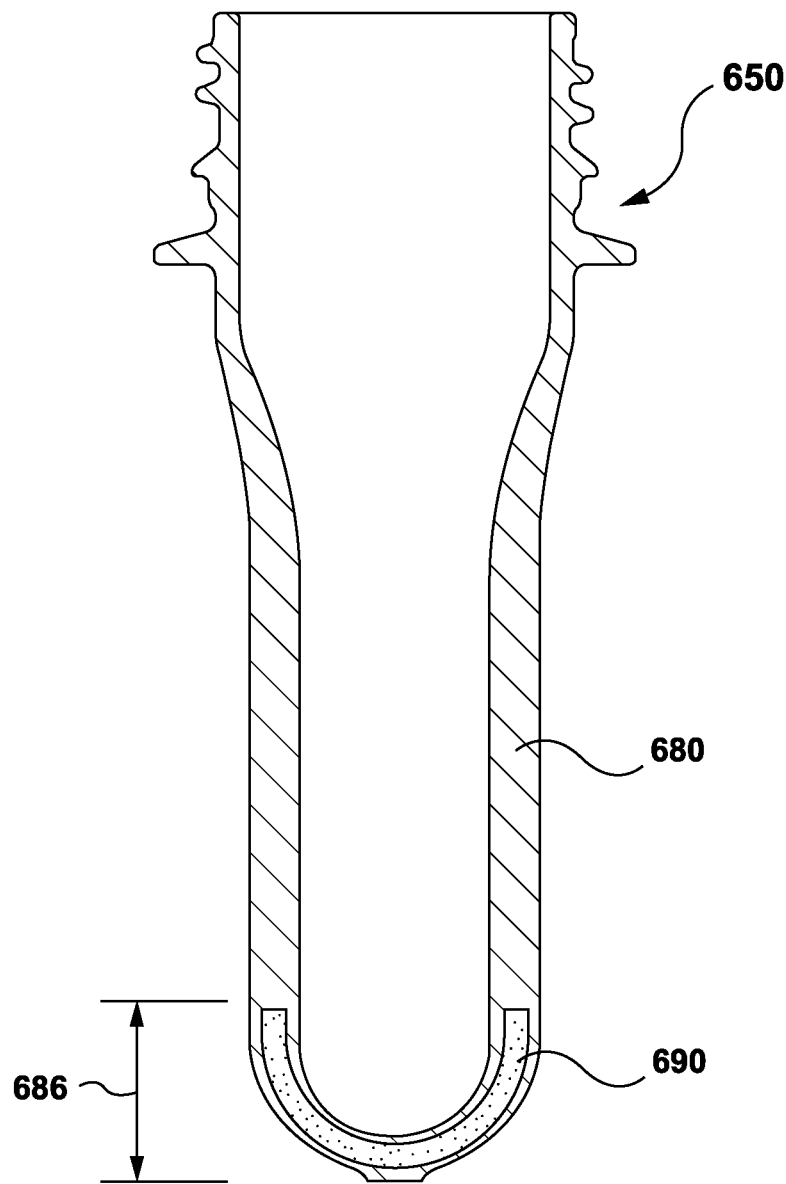
FIG. 15 is a side, cross-sectional schematic view of a preform according to yet another non-limiting embodiment of the present technology.

With reference to FIG. 15, yet another embodiment of a preform 650 for use in a system for forming and filling the final-shaped container 15 using the liquid product to be contained in the final-shaped container 15 is depicted.

In the illustrated embodiment, a core layer 690 is included in a gate portion 686 of the preform 650, between layers of a skin material 680. However, it is contemplated that the core layer 690 could extend through more or less of the cross section of the preform 650. For example, it is contemplated that the core layer 690 could extend through at least a portion of the body portion of the preform 650 and/or through at least a portion of the neck portion of the preform 650. It is also contemplated that the preform 650 could include additional core layers, such as the core layer 39 of preform 50, in addition to the core layer 690 depicted in the illustrated embodiment.

In this embodiment, the core layer 690 contains an additive which causes the core layer 690 to absorb more infrared radiation and/or thermal energy than the skin material 680, the additive being configured to change the thermal heating rate of the gate portion 686. In this way, the gate portion 686 need not necessarily be isolated from the liquid during the molding process. Instead the gate portion 686 itself begins at a higher temperature than remaining portions of the preform 650, such that the gate portion 686 does not cool to a hardening temperature as quickly as the remaining portions of the preform In some embodiments, the additive could be a colorant which absorbs more thermal energy than the surrounding skin layers. The core layer 690 would generally be made of PET, or other known preform materials, with the colorant additive added thereto. In some cases, the colorant could affect the thermal properties of the gate portion 686, while also serving to modify the aesthetics of the final molded product.

In some other embodiments, the additive could be a fast reheat additive, which would allow the gate portion 686 to more efficiently absorb thermal energy to increase the heating of the gate portion 686. Some non-limiting examples of fast reheat additives that could be employed include, but are not limited to, Fast Reheat Additive U1 (product of Polytrade Global GmbH) and ColorMatrix™ Joule™ RHB Fast Reheat Dispersions (product of PolyOne Corporation).

In some embodiments, the core layer 690 could include an additive that has a different absorption spectrum, colored or not, such that the core layer 690 absorbs more infrared light energy, causing the core layer 690 to heat more than the skin material 680 under a same illumination source.

Although illustrated in the core layer 690, it is contemplated that the thermally isolating material could be disposed in the inner or outer layers of a multilayer preform, such as the preform 50.

Core with Channels

Figure 16:
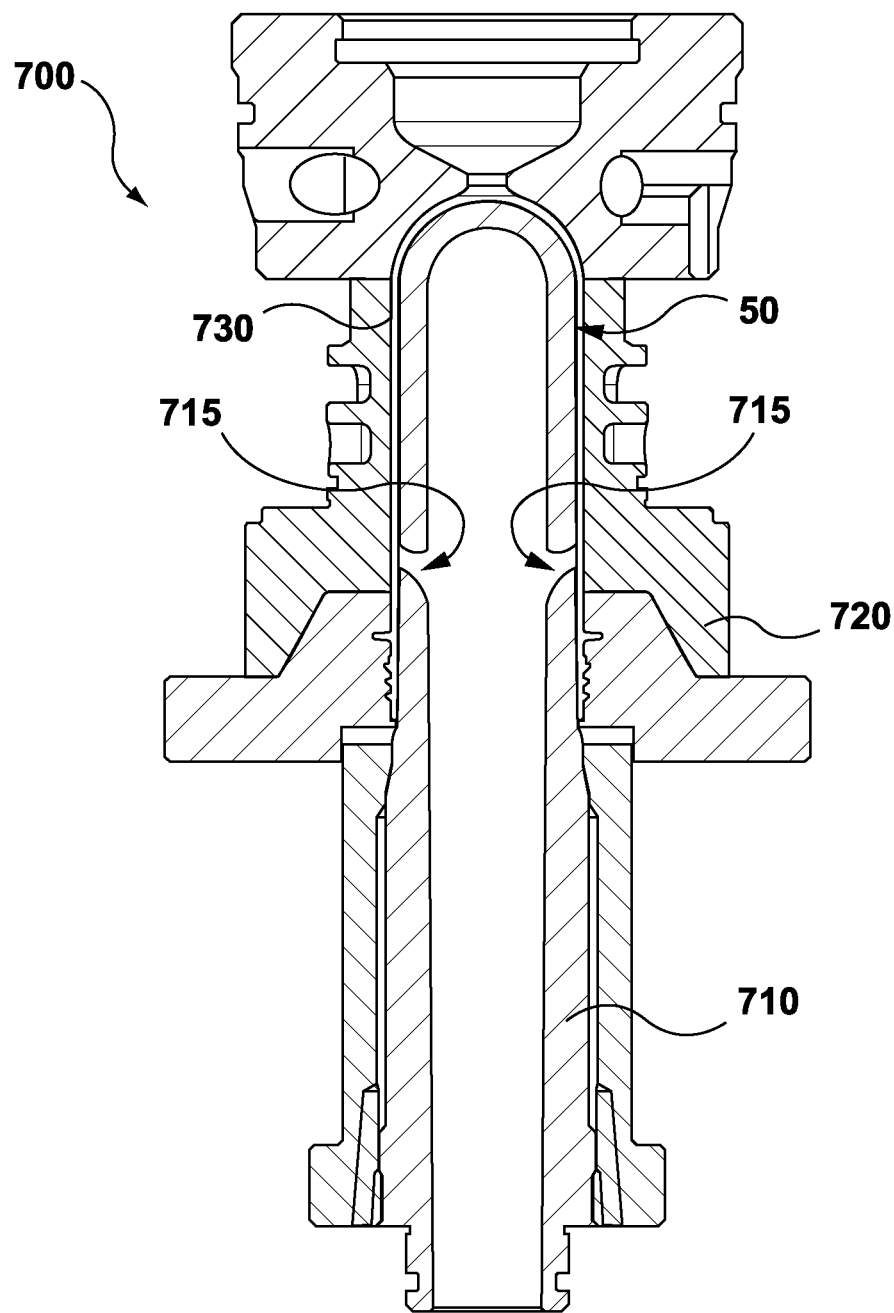
FIGS. 16 to 18 depict cross-sectional views of a portion of a molding stack used in a molding machine, the molding stack implemented according to yet another non-limiting embodiment of the present technology.
Figure 17:
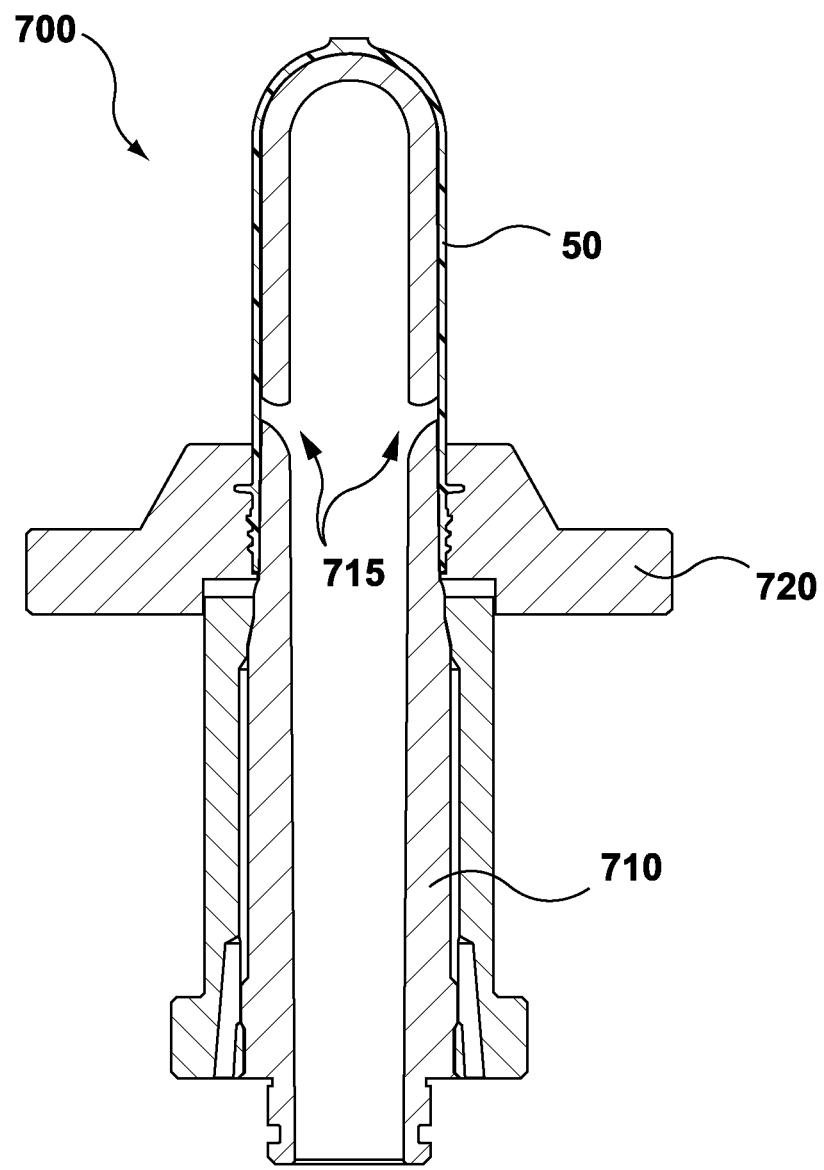
Figure 18:
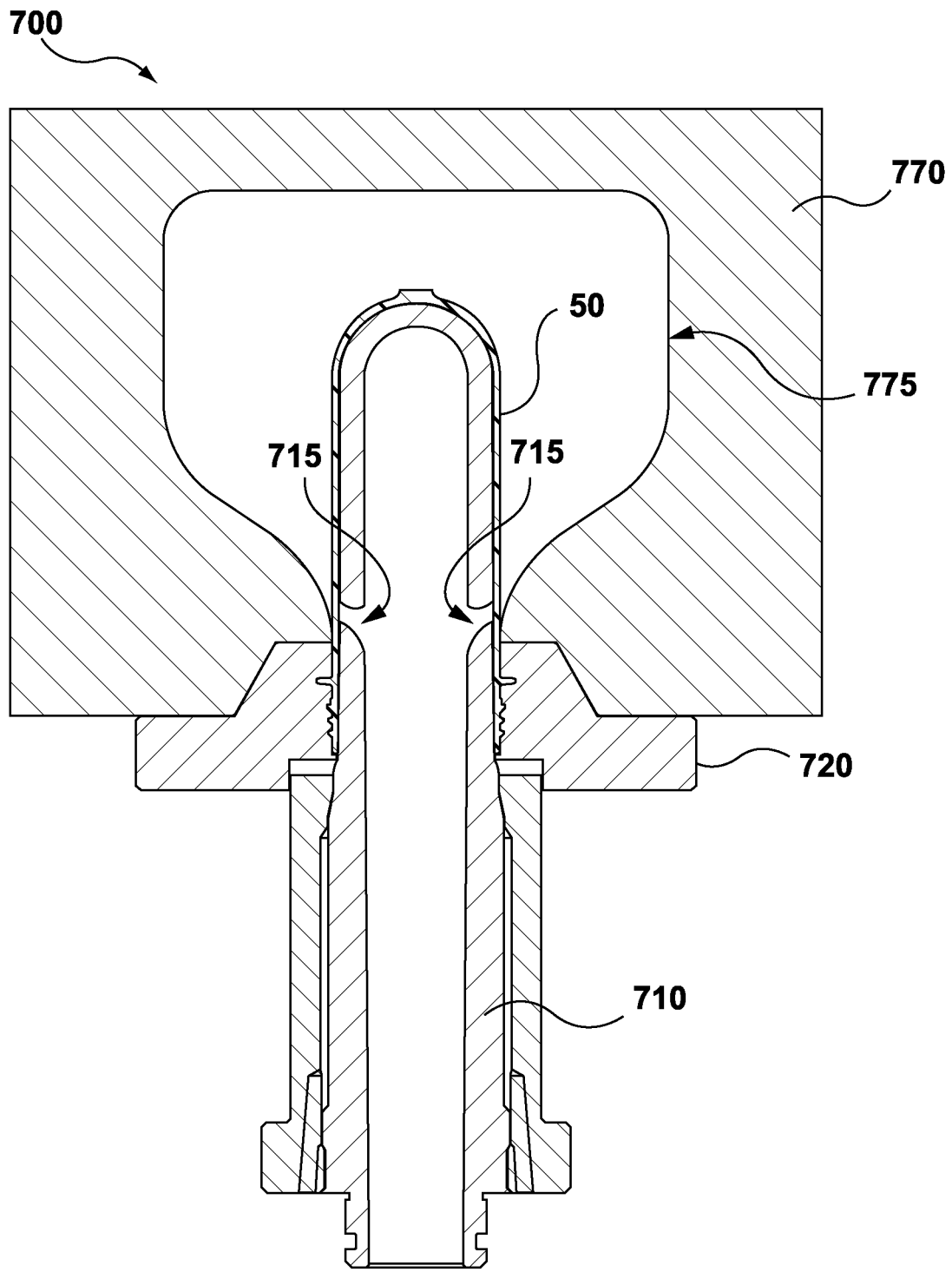

With reference to FIGS. 16 to 18, yet another embodiment of the present technology is depicted, where a molding stack 700 is configured for forming and filling the final-shaped container 15 using the liquid product to be contained in the final-shaped container 15.

The overall construction of the molding stack 700 is well known to those of skill in the art and as such only those components of the molding stack 700 that are specifically adapted for implementation of the embodiments of the present technology will be described herein below.

In accordance with these non-limiting embodiments of the present technologies, the preform 50 is formed using the molding stack 700 positioned in the molding system 100. More specifically, the preform 50 is molded in a mold cavity defined at least in part between a mold core 710 and a mold cavity portion 730 (as well as neck rings 720) of the molding system 100.

The preform 50 is then removed from the mold cavity portion 730, the preform remaining on a mold core 710. The mold core 710, with the preform 50 still disposed thereon, is then placed in a container mold 770 having an internal surface 775 (similar to those described above, see FIG. 18).

The preform 50 is then stretched into conformity with the internal surface 775 of the mold cavity 770 by filling an interior of the preform 50 with the liquid through a channel 715 defined in the mold core 710, pressure of the liquid entering the preform 50 through the mold core 710 causing the preform 50 to expand.

In some embodiments of the present technology, the steps of locating and the stretching are performed before the preform 50 has cooled to a threshold temperature.

Preform-Preblowing-Liquiforming

Figure 19:
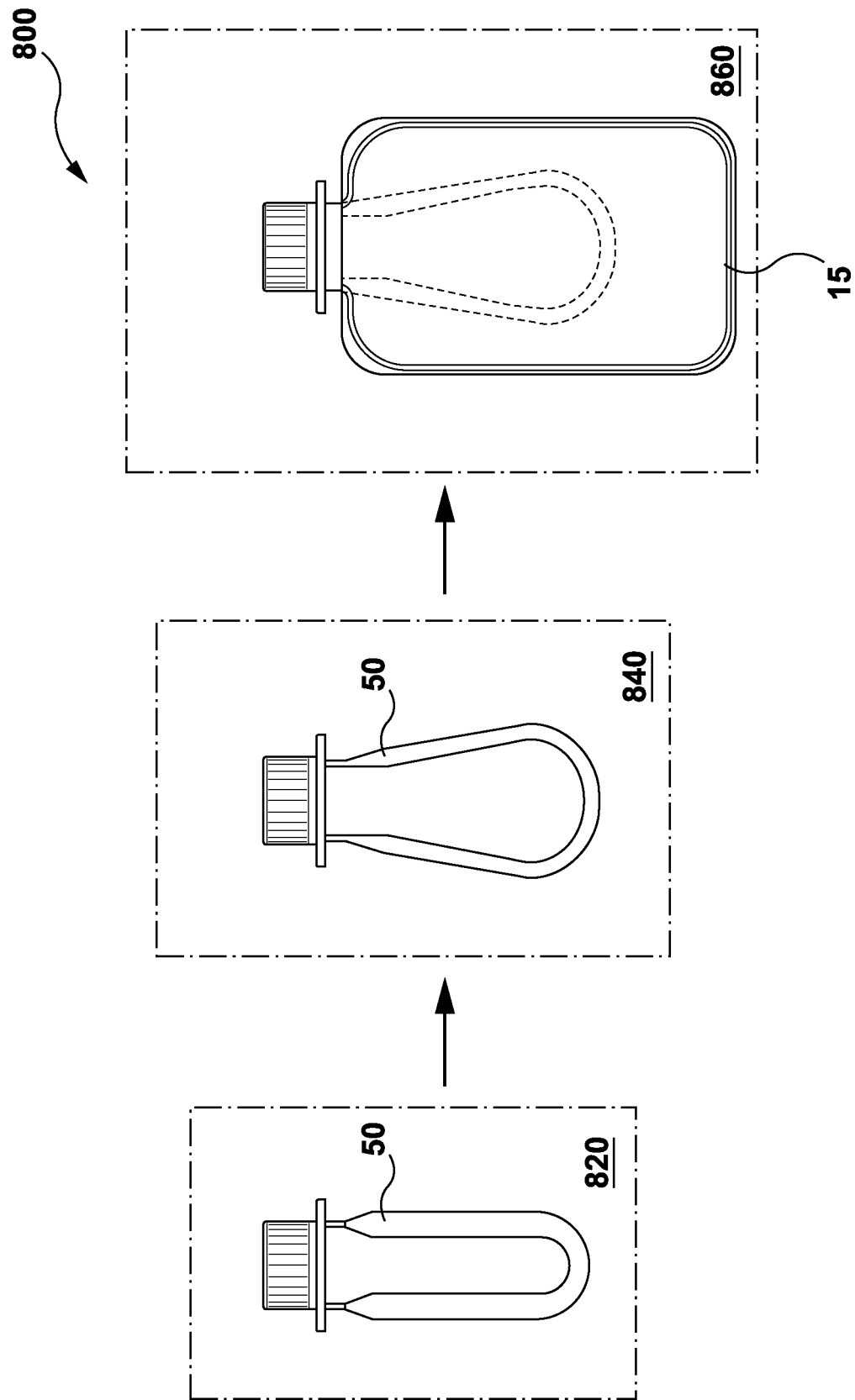
FIG. 19 schematically depicts a process of creating final-shaped containers according to yet another non-limiting embodiment of the present technology.
Figure 20:
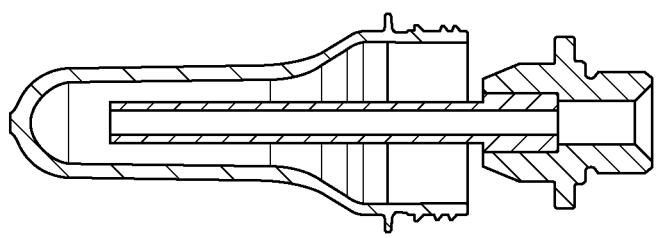
FIG. 20 depicts a non-limiting embodiment of an end-of-arm tool for used for implementing the process of FIG. 19.
Figure 20:
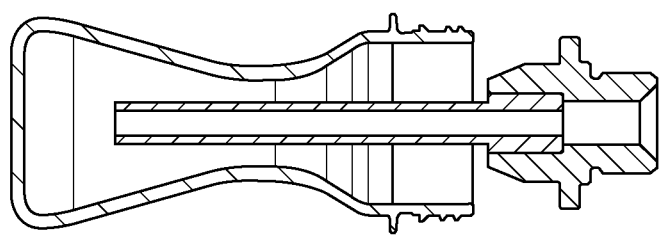
Figure 20:
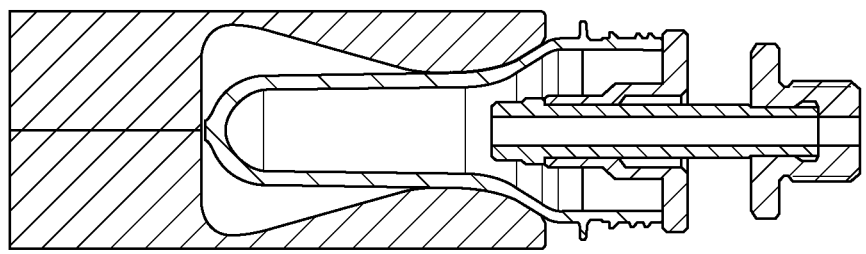
Figure 21:
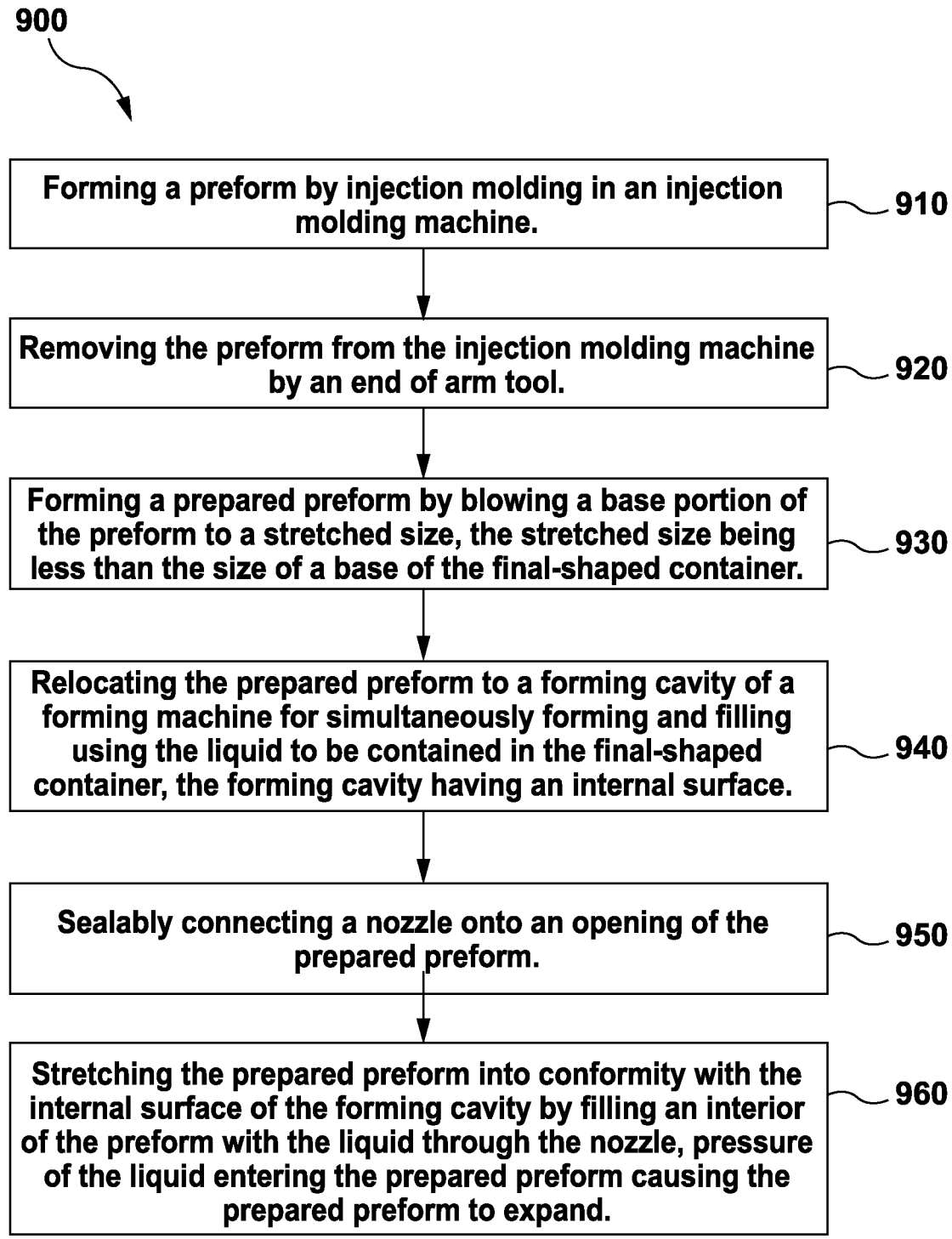
FIG. 21 is a schematic flow chart of another non-limiting embodiment of a method according to the present technology.

With reference to FIGS. 19 to 21, yet another embodiment is depicted of a process 800 and a method 900 for forming and filling the final-shaped container 15 using the liquid product to be contained in the final-shaped container 15.

With reference to FIG. 19, the process 800 will be described in more detail.

Stage 820

In accordance with these non-limiting embodiments of the present technologies, the preform 50 is formed using the molding system 100. More specifically, the preform 50 is molded in a mold cavity defined at least in part between a mold core and a mold cavity portion (as well as neck rings) of the molding system 100.

The preform 50 is then removed from the mold cavity portion, the preform remaining on a mold core. The preform 50 is then removed from the mold core by the robot 122.

Stage 840

The preform 50 is then pre-processed into a prepared preform by blowing a base portion of the preform to a stretched size, the stretched size being less than the size of a base of the final-shaped container. In other embodiments, the preform could be prepared by partially blowing a different portion than the base portion, or additional portions of the preform.

In some embodiments of the present technology, the pre-processing can be done in the robot 122 (see for example, FIG. 20). In such an embodiment, the robot 122 would include a forming cavity (FIG. 20, not separately numbered) adapted for forming the prepared preform. Some examples of the modifications that may be required to the robot 122 are depicted in FIG. 20.

In other embodiments of the present technology, the pre-processing can be done in a forming cavity of a preparation station, the preparation station being separate from the forming machine and the robot 122.

Stage 860

The prepared preform is then relocated to a forming cavity of a forming machine for simultaneously forming and filling using the liquid to be contained in the final-shaped container 15, the forming cavity having an internal surface.

With reference to FIG. 21, there is depicted a flow chart of a method 900 for forming and filling the final-shaped container.

Step 910

Forming the preform 50 by injection molding in the molding system 100.

Step 920

Removing the preform 50 from the molding system 100 by the robot 122.

Step 930

Forming the prepared preform by blowing a base portion of the preform 50 to a stretched size, the stretched size being less than the size of a base of the final-shaped container 15.

In some embodiments, the forming the prepared preform at step 930 is performed by the robot 122. In other embodiments, the forming the prepared preform at step 930 is performed by another device, separate from the robot 122 and from the forming system.

Step 940

Relocating the prepared preform to a forming cavity of a forming machine for simultaneously forming and filling using the liquid to be contained in the final-shaped container, the forming cavity having an internal surface.

Step 950

Sealably connecting the nozzle onto an opening of the prepared preform.

Step 960

Stretching the prepared preform into conformity with the internal surface of the forming cavity by filling an interior of the preform with the liquid through the nozzle, pressure of the liquid entering the prepared preform causing the prepared preform to expand.

Depending on the specific implementation, any of the above described apparatuses or systems could be adapted for stretching the prepared preform.

The invention claimed is:

1. An apparatus for simultaneously forming and filling a final-shaped container from a preform using a liquid, the liquid being a product to be contained in the final-shaped container, the apparatus comprising:
    a mold cavity for forming the final-shaped container from the preform;
    a stretch rod for stretching the preform movable between at least a retracted position outside the mold cavity to an advanced position within the mold cavity,
    a lower portion of the stretch rod being configured for sealably connecting with an interior surface of the preform to at least partially isolate a gate portion of the preform; and
    a nozzle for sealably connecting with an opening of the preform, the nozzle including:
    a channel fluidly communicating with an interior of the preform for transmission of the liquid to expand the preform into conformity with the mold cavity and form the container therein,
    the channel being further configured to receive the stretch rod therethrough.

2. The apparatus of claim 1, wherein the channel further fluidly communicates with a pressurized air source for performing a preliminary stretch of the preform by blow molding.

3. The apparatus of claim 1, wherein:
    the stretch rod comprises a deformable member configured to at least partially isolate the gate portion of the preform from the liquid when extended,
    the liquid causing the deformable member to extend out from the stretch rod to contact the interior surface of the preform to form a temporary seal to at least partially isolate the gate portion from the liquid when filling an interior of the preform with the liquid through the nozzle.

4. The apparatus of claim 3, wherein the deformable member is made at least in part from a thermally isolating material.

5. The apparatus of claim 3, wherein the deformable member is made at least on part from a material having low thermal conductivity.

6. The apparatus of claim 5, wherein the material having low thermal conductivity is one of a polymer and a rubber.

7. The apparatus of claim 1, wherein:
    the stretch rod comprises a controllably-extendible sealing member for sealably connecting the lower portion of the stretch rod with the interior surface of the preform the controllably-extendible sealing member selectively and at least partially isolating the gate portion of the preform from the liquid when extended; and wherein
    the apparatus further comprises an actuator for extending the controllably-extendible sealing member.

8. The apparatus of claim 7, wherein the controllably-extendible sealing member is made at least in part from a thermally isolating material.

9. An apparatus for simultaneously forming and filling a final-shaped container from a preform using a liquid, the liquid being a product to be contained in the final-shaped container, the apparatus comprising:
    a mold cavity for forming the final-shaped container from the preform;
    a stretch rod for stretching the preform movable between at least a retracted position outside the mold cavity to an advanced position within the mold cavity, the stretch rod including:
    a selectively heatable tip; and
    a nozzle for sealably connecting with an opening of the preform, the nozzle including:
    a channel fluidly communicating with an interior of the preform for transmission of the liquid to expand the preform into conformity with the mold cavity and form the container therein, the channel being further configured:
    to receive the stretch rod therethrough.

10. The apparatus of claim 9, wherein the selectively heatable tip comprises an internal resistor for causing at least a lower portion of the stretch rod to heat.

11. The apparatus of claim 9, wherein the stretch rod defines at least one channel fluidly communicating with an interior of the preform and a pressurized air source, the stretch rod being configured for partial blow-molding of the preform prior to transmission of the liquid.

* * * * *